(12) United States Patent
Kurotaki

(10) Patent No.: US 7,558,470 B2
(45) Date of Patent: Jul. 7, 2009

(54) DIGITAL BROADCAST RECORDING APPARATUS

(75) Inventor: Mitsuru Kurotaki, Lawrenceville, NJ (US)

(73) Assignee: Panasonic Corporation, Osaka (JP)

( * ) Notice: Subject to any disclaimer, the term of this patent is extended or adjusted under 35 U.S.C. 154(b) by 749 days.

(21) Appl. No.: 11/295,651

(22) Filed: Dec. 7, 2005

(65) Prior Publication Data

US 2006/0120523 A1 Jun. 8, 2006

(30) Foreign Application Priority Data

Dec. 8, 2004 (JP) .............................. 2004-355430

(51) Int. Cl.
*H04N 5/91* (2006.01)
*H04N 7/26* (2006.01)

(52) U.S. Cl. ........................................ 386/109; 386/94

(58) Field of Classification Search .................. 386/94, 386/125, 83, 46, 124, 113, 116, 109, 111, 386/112

See application file for complete search history.

(56) References Cited

U.S. PATENT DOCUMENTS

| 5,111,444 A | * | 5/1992 | Fukushima et al. | ...... 369/53.17 |
|---|---|---|---|---|
| 5,406,625 A | | 4/1995 | Kotaka et al. | |
| 2005/0047596 A1 | | 3/2005 | Suzuki | |
| 2005/0100321 A1 | | 5/2005 | Koudo et al. | |

FOREIGN PATENT DOCUMENTS

| EP | 0338866 | 10/1989 |
|---|---|---|
| EP | 0543668 | 5/1993 |
| JP | 10-215444 | 8/1998 |

OTHER PUBLICATIONS

U.S. Appl. No. 11/285,165 to Takao, filed Nov. 23, 2005.
English language Abstract of JP 10-215444.
U.S. Appl. No. 11/285,165 to Takao, filed Nov. 23, 2005.
English language Abstract of JP 10-215444.dated Nov. 8, 1998.

* cited by examiner

*Primary Examiner*—Robert Chevalier
(74) *Attorney, Agent, or Firm*—Greenblum & Bernstein, P.L.C.

(57) ABSTRACT

The present invention provides a digital broadcast recording apparatus which prevents an unnecessary recording in a situation where it is not possible to descramble a program or it is prohibited to record a scrambled program. The digital broadcast recording apparatus includes a descrambler that detects a channel where a descrambling-not-possible situation occurs. The apparatus also includes a service manager which terminates the recording and writes, into a management table, that a descrambling-not-possible situation has occurred during recording, when there is recording data showing that recording is being executed on the channel which is detected as having the descrambling-not-possible situation.

20 Claims, 37 Drawing Sheets

FIG. 3

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG. 4

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG. 5

| Frequency band | Usage |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

FIG. 18A

| 1701 | 1702 | 1703 | 1704 | 1705 | 1706 | 1707 |
|---|---|---|---|---|---|---|
| Recording number | Channel | Recording start time | Recording end time | Execution status | Scramble | Problem during recording |
| 1 | 2 | 2004/3/10 9:00 | 2004/3/10 11:00 | 2 | 1 | 1 |
| 2 | 2 | 2004/3/10 11:00 | 2004/3/10 12:00 | 0 | 1 | 0 |

| 1701 | 1702 | 1703 | 1704 | 1705 | 1706 | 1707 |
|---|---|---|---|---|---|---|
| Recording number | Channel | Recording start time | Recording end time | Execution status | Scramble | Problem during recording |
| 1 | 2 | 2004/3/10 9:00 | 2004/3/10 11:00 | 2 | 1 | 1 |
| 2 | 2 | 2004/3/10 11:00 | 2004/3/10 12:00 | 1 | 1 | 0 |

1708, 1709

| Java program identifier 2001 | Control information 2002 | DSMCC identifier 2003 | Program name 2004 |
|---|---|---|---|
| 0x301 | autostart | 1 | /a/TopXlet |
| 0x302 | present | 1 | /b/GameXlet |

2011 → row 1; 2012 → row 2

FIG. 26

| Recording number | Program name | Problem during recording |
|---|---|---|
| 1 | Cinema BBB | 1 |

FIG. 28

| 1701 | 1702 | 1703 | 1704 | 1705 | 1706 | 1707 | 2701 | 2702 |
|---|---|---|---|---|---|---|---|---|
| Recording number | Channel | Recording start time | Recording end time | Execution status | Scramble | Problem during recording | Problem period | Cause |
| 1 | 2 | 2004/3/10 9:00 | 2004/3/10 11:00 | 2 | 1 | 1 | 9:35~9:40<br>10:10~10:30<br>... | 2<br>1<br>... |
| 2 | 2 | 2004/3/10 11:00 | 2004/3/10 12:00 | 0 | 1 | 0 | — | — |

1708 — row 1
1709 — row 2

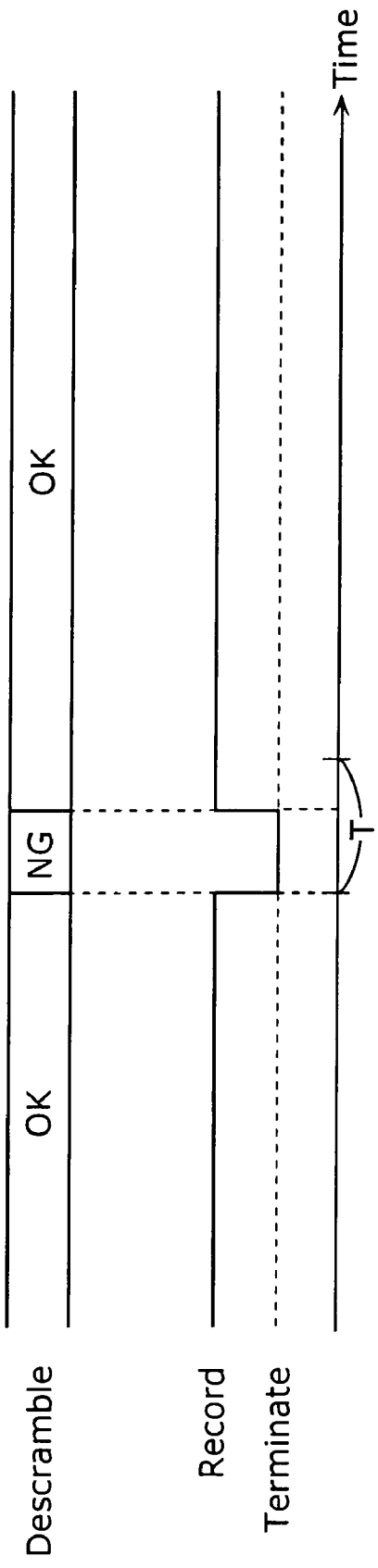
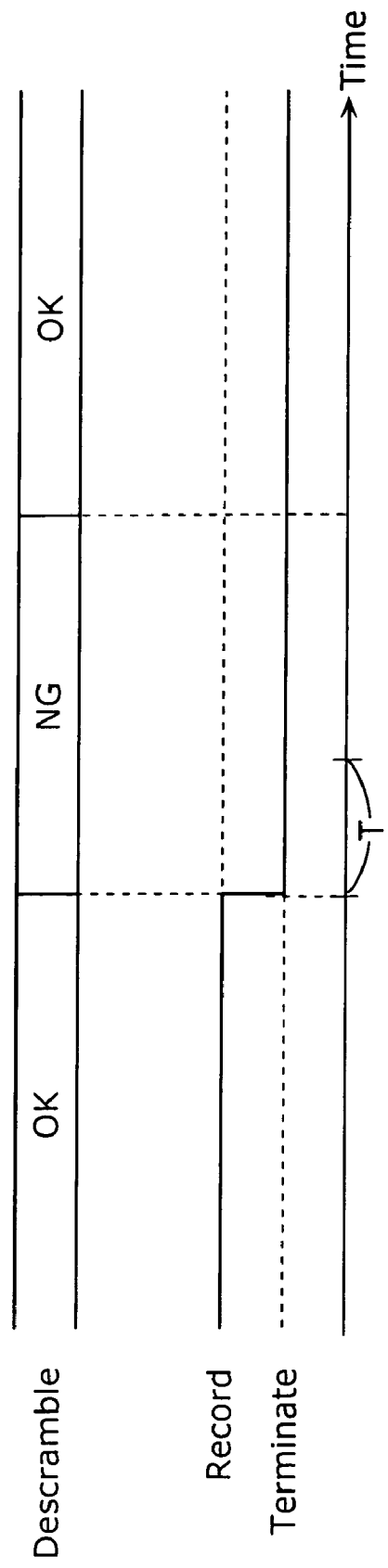

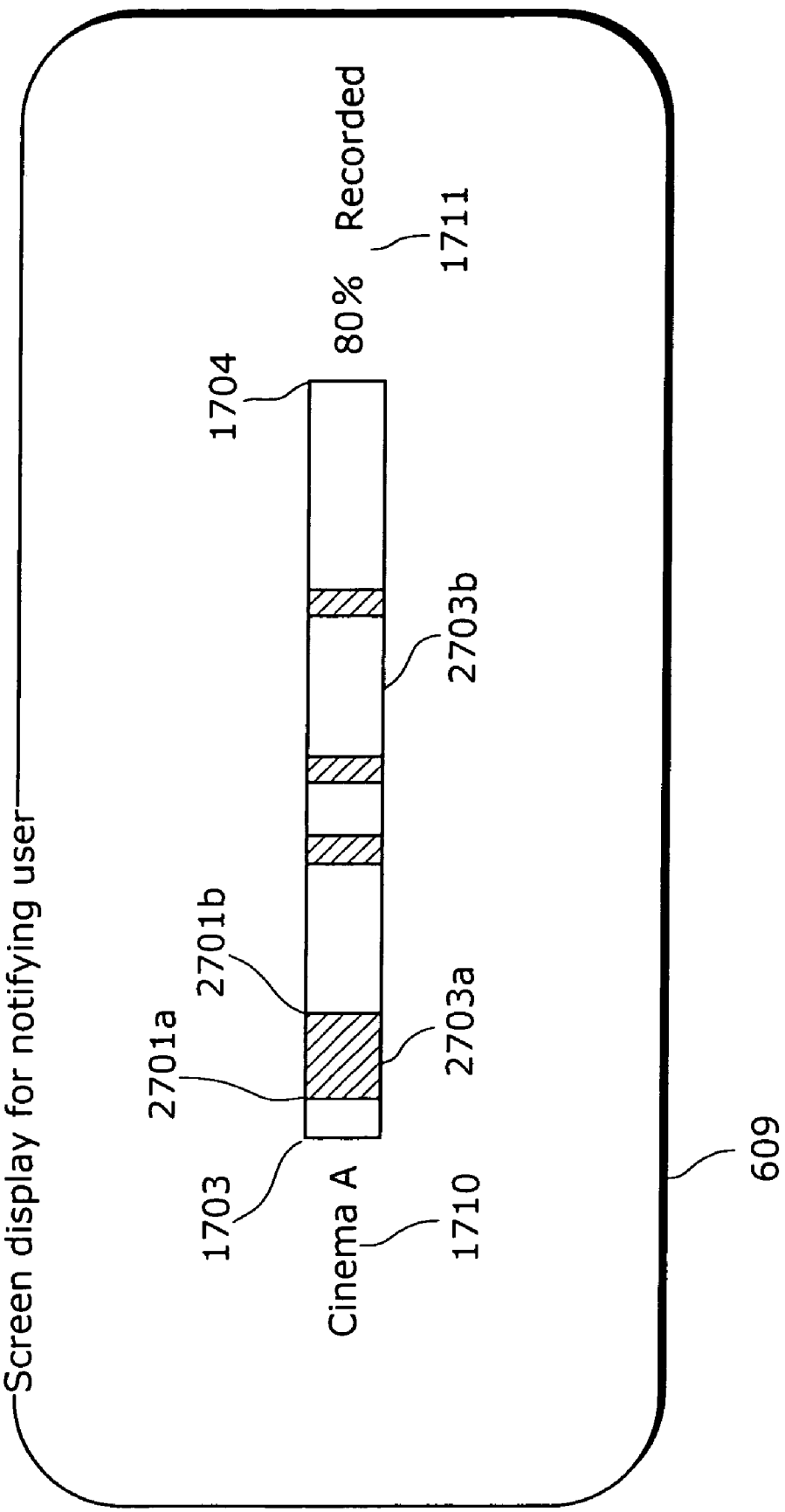

FIG. 33

| | 1701 | 1702 | 1703 | 1704 | 1705 | 1706 | 1707 | 2701 | 2702 |
|---|---|---|---|---|---|---|---|---|---|
| | Recording number | Channel | Recording start time | Recording end time | Execution status | Scramble | Problem during recording | Problem period | Cause |
| 1708 | 1 | 2 | 2004/3/10 9:00 | 2004/3/10 11:00 | 3 | 1 | 1 | 9:35~9:40<br>10:10~10:30<br>..........<br>10:40~ | 1 |
| 1709 | 2 | 2 | 2004/3/10 11:00 | 2004/3/10 12:00 | 0 | 1 | 0 | | 0 |

FIG. 34

| 1701 Recording number | 1702 Channel | 1703 Recording start time | 1704 Recording end time | 1705 Execution status | 1706 Scramble | 1707 Problem during recording | 2701 Problem period | 2702 Cause |
|---|---|---|---|---|---|---|---|---|
| 1 | 2 | 2004/3/10 9:00 | 2004/3/10 11:00 | 3 | 1 | 1 | 9:35~9:40<br>10:10~10:30<br>……<br>10:40~10:45 | 1 |
| 2 | 2 | 2004/3/10 11:00 | 2004/3/10 12:00 | 1 | 1 | 0 | | 0 |

| Recording number | Channel | Recording start time | Recording end time | Execution status | Scramble | Problem during recording | Problem period | Cause |
|---|---|---|---|---|---|---|---|---|
| 1 | 2 | 2004/3/10 9:00 | 2004/3/10 11:00 | 4 | 1 | 1 | 9:35~9:40<br>10:10~10:30<br>.........<br>10:40~10:45 | 1 |
| 2 | 2 | 2004/3/10 11:00 | 2004/3/10 12:00 | 1 | 1 | 0 | | 0 |

DIGITAL BROADCAST RECORDING APPARATUS

BACKGROUND OF THE INVENTION (1) Field of the Invention

The present invention relates to a digital broadcast recording apparatus which receives a scrambled digital broadcast, and particularly to a digital broadcast recording apparatus which performs recording processes such as timer-recording of a program and the like, or to a digital broadcast recording apparatus having a built-in reproduction function (also known as digital broadcast recording reproduction apparatus).

(2) Description of the Related Art

In a digital broadcast, a pay program is scrambled and distributed. The distributed program can only be descrambled and then viewed on a terminal of a user who has paid a viewing fee.

This descrambling function ceases to function on specific conditions. For example, when a contract term with a broadcast operator expires, or when an IC card or descrambling module which authenticates a contract-holder is removed from a receiving terminal. In these cases, as the receiving terminal outputs a scrambled video, the user is annoyed, and in the case where a program is being recorded, unneeded scrambled video is recorded.

In the conventional technology, when descrambling is not possible in the receiving terminal for scrambled broadcasts, problems are avoided by switching the video output of the receiving terminal (for example, see Japanese Laid-Open Patent Application No. 10-215444 Publication). As shown in FIG. 1, the conventional method for responding to when descrambling is prohibited or not possible mainly includes: a step of judging whether or not a program on a current channel has become new (S3001), a step of judging whether or not the new program can be viewed (S3002), a step of receiving the current channel when viewing is possible (S3003), and a step of receiving a promotional channel when viewing is not possible (S3004).

Thus in the conventional technology, in the case where descrambling becomes not possible, the outputting of scrambled video is prevented by changing the channel to be received to a channel that can be descrambled or a channel that is not scrambled, and outputting such received channel.

However, although, in the conventional technology, the recording of a scrambled video can be avoided when descrambling becomes not possible during the recording of a scrambled video, the change to a video which is different from the original program presents a problem in that the recording becomes intermittent.

For that reason, when storing on a recording medium (an HD (hard disk), a re-writable optical disc, a (once only) recordable disc, a memory, and so on), unneeded recording appears intermittently. As a result, the existence of useless recording is confirmed while the viewer is viewing the recorded program. Aside from being very annoying, it puts a strain on the available capacity of storage media through the storing of unneeded and useless information onto the recording medium. In addition, when the recording medium to be used for storing is a recording medium such as a CD-R (Compact Disc Recordable) or a DVD-R (Digital Versatile Disc Recordable) which can only be written-on once, it is possible that, at worst, the recording medium itself becomes useless as, in the case where the above-mentioned situation occurs, the area on which unneeded information is stored into can no longer be overwritten.

SUMMARY OF THE INVENTION

Consequently, the present invention is conceived to solve the aforementioned conventional problem and has as an objective to provide a terminal apparatus which can prevent recording which is not required by the viewer, and which can recognize problems in the contents of a recorded program without the details of the recorded program being viewed by the viewer, in the situation in which descrambling becomes prohibited or not possible during the recording of a descrambled video.

In order to achieve the aforementioned objective, the digital broadcast recording apparatus according to the present invention is a digital broadcast recording apparatus including: a first demodulation unit which demodulates received scrambled data using information including a designated frequency, and to output the demodulated scrambled data; a descrambler unit which descrambles the scrambled data demodulated by said first demodulation unit, and to output an MPEG-2 transport stream; a retrieving unit which retrieves, from the MPEG-2 transport stream outputted by said descrambler unit, AV data and a file system which makes up an application; an execution unit which executes the application made up by the file system; a recording control unit which receives a record request from the executed application, and which controls recording according to the received record request; a recording unit which records the retrieved AV data according to an instruction from said recording control unit; a holding unit which holds management information for managing the recorded data; and a detection unit which detects a problem which occurs in processing performed from after the demodulating of the scrambled data by said first demodulation unit until the retrieving of the AV data, wherein, in the case where said detection unit detects the problem during recording of data by said recording unit, said recording control unit writes, into the management information, the detected problem and a time at which the problem occurred.

Accordingly, in the case where a problem is detected during the recording of AV data, the detected problem and the time at which the problem occurred can be managed on a per AV data basis.

Here, said recording control unit may control said recording unit to terminate the recording, after said detection unit detects the problem.

Accordingly, as AV data for which a problem has been detected is not recorded, unneeded recording can be prevented.

Furthermore, in the case where, after the recording by said recording unit is terminated when said detection unit detects the problem, said detection unit can no longer detect the problem, said recording control unit may control resumption of the recording by said recording unit, according to a predetermined condition.

Accordingly, the storing of data can be resumed depending on the time (duration) for which descrambling was not possible.

Furthermore, the digital broadcast recording apparatus may further include a media writing unit which stores, onto a writeable medium, the AV data recorded by said recording unit.

Here, said media writing unit may refer to the management information when the recorded AV data is to be stored onto the medium, and may not store the AV data onto the medium in the case where the problem occurred during the recording of the AV data to be stored.

Accordingly, it is possible to prevent the recording of AV data for which a problem was detected during the recording of data.

Furthermore, the digital broadcast recording apparatus may further include a notification unit which refers to the management information when the recorded AV data is to be stored onto the medium, and, in the case where the problem occurred during the recording of the AV data to be stored, notifies a user of the occurrence of the problem during the recording.

Accordingly, as defects such as when a problem is detected during the recording of the data being stored can be recognized, even without the user verifying the details of the AV data beforehand, it is possible to accurately judge whether or not the data should be stored onto the medium.

Here, the digital broadcast recording apparatus may further include an instruction obtainment unit which obtains, from the user, an instruction which is based on the notification by said notification unit, wherein said media writing unit may store the data onto the medium in the case where the instruction obtained by said instruction obtainment unit is a write instruction.

Accordingly, not only is it possible for data for which a problem is detected during data recording, to be stored onto media according to the instruction of the user, it is possible to prevent the recording of unneeded data onto the medium (especially in media that can only be written on once).

Moreover, aside from being realized as the aforementioned digital broadcast recording apparatus, the present invention can also be realized as a digital broadcast recording method having the characteristic units included in such digital broadcast recording apparatus as steps, and as a program which causes a computer to execute such steps. Furthermore, it goes without saying that such a program can be distributed via a recording medium such as a CD-ROM, and a transmission medium such as the Internet.

As described in the aforementioned manner, according to the digital broadcast recording apparatus in the present invention, the occurrence of a descrambling-not-possible situation during the recording of the data can be managed on a per data basis. Furthermore, in the case where a situation in which descrambling is not possible occurs during the recording of data, the continued recording of unneeded data can be prevented and it is possible to conserve resources used in the storage of data. Accordingly, the practical value of the present invention in today's setting, where digital broadcast recording apparatus for receiving and storing scrambled data are widely used, is extremely high.

FURTHER INFORMATION ABOUT TECHNICAL BACKGROUND TO THIS APPLICATION

The disclosure of Japanese Patent Application No. 2004-355430 filed on Dec. 8, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 shows an example of the usage of the frequency bands used in communication between the head end and the terminal apparatus in the cable television system according to the present invention;

FIG. 4 shows an example of the usage of the frequency bands used in communication between the head end and the terminal apparatus in the cable television system according to the present invention;

FIG. 5 shows an example of the usage of the frequency bands used in communication between the head end and the terminal apparatus in the cable television system according to the present invention;

FIG. 18 shows an example of the management table stored in the secondary storage unit according to the present invention;

FIG. 26 shows an example of a screen display of the display according to the present invention;

FIG. 28 shows an example of the management table stored in the secondary storage unit according to the present invention;

FIG. 30 is a diagram describing the resumption of recording depending on the duration for which descrambling was not possible, in the second embodiment;

FIG. 31 is a diagram showing an example of problem information notified to the user, in the third embodiment;

FIG. 33 shows an example of management table in the fourth embodiment;

FIG. 34 shows an example of management table in the fourth embodiment;

FIG. 35 shows an example of management table in the fourth embodiment;

DESCRIPTION OF THE PREFERRED EMBODIMENT(S)

The embodiments of the present invention are described, hereinafter, with reference to the diagrams.

First Embodiment

Figure 1:
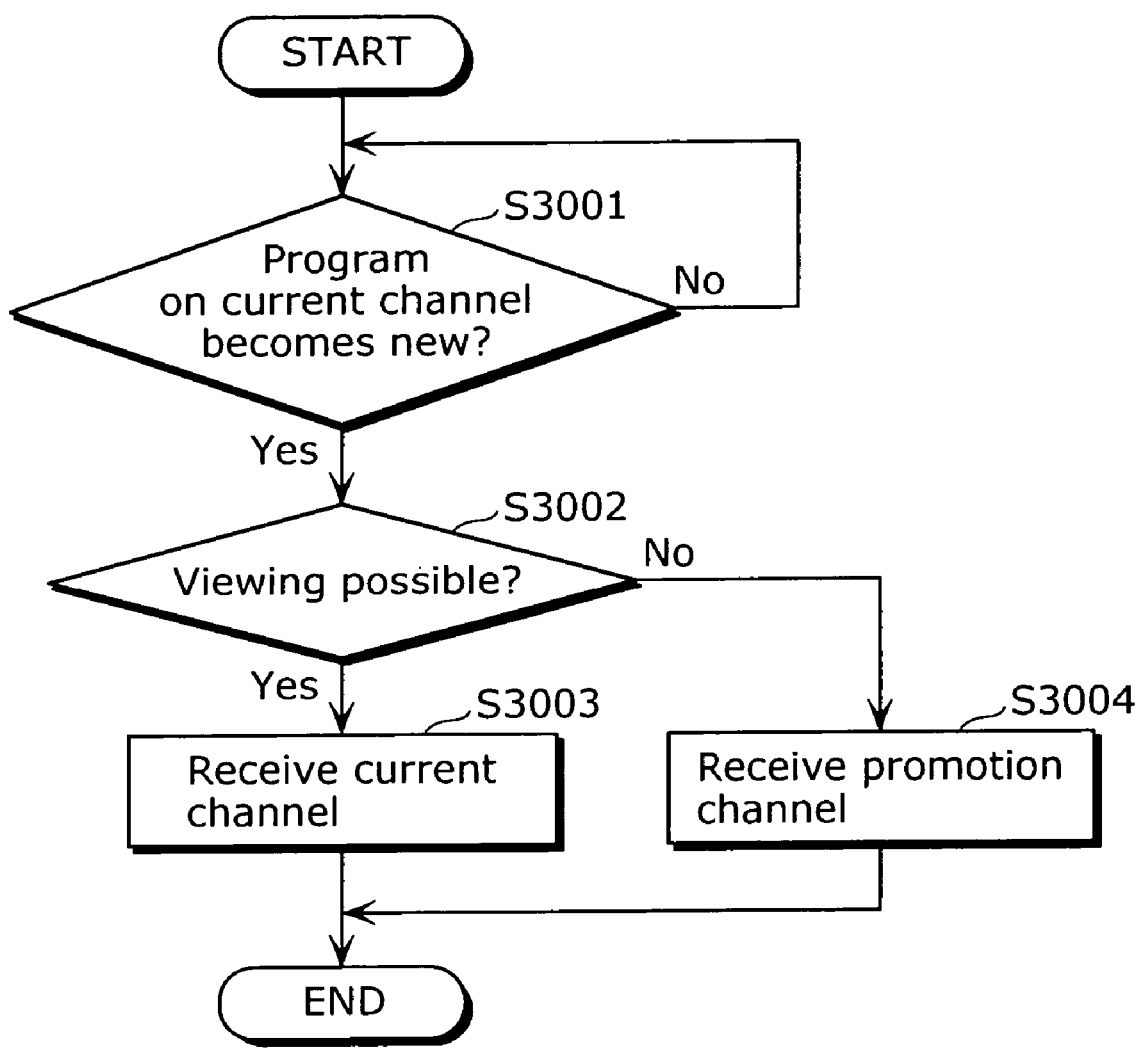
FIG. 1 is a structure diagram showing the structure of the conventional program execution apparatus.
Figure 2:
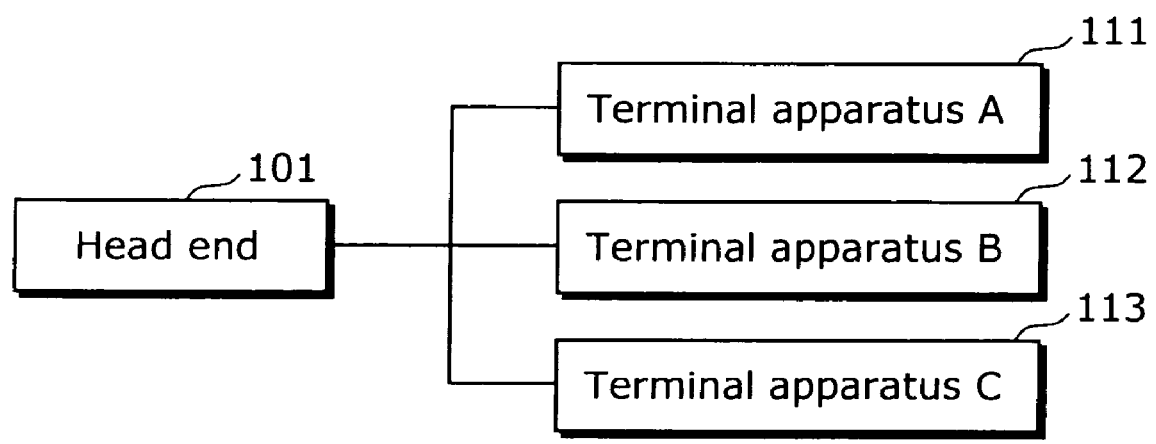
FIG. 2 is a structure diagram of the first embodiment of the cable television system according to the present invention.

The embodiment of the cable television system in the present invention is described with reference to the diagrams. FIG. 2 is a block diagram representing the relationship of apparatuses making up a cable system. The cable system includes a head end 101, and three terminal apparatuses, namely a terminal apparatus A111, a terminal apparatus B112, and a terminal apparatus C113. In the present embodiment, three terminal apparatuses are connected to one head end. However, the present invention can be carried out even with an arbitrary number of terminal apparatuses being connected to the head end.

The head end 101 transmits, to plural terminal apparatuses, broadcast signals such as video, audio and data, and receives data transmitted from the terminal apparatuses. In order to realize this, frequency bands are divided for use in data transmission between the head end 101, and the terminal apparatus A111, the terminal apparatus B112, and the terminal apparatus C113. FIG. 3 is a table showing an example of divided frequency bands. There are roughly two types of frequency bands: Out of Band (to be abbreviated as OOB) and In-Band.

A frequency band of 5~130 MHz is allocated to OOB to be mainly used for data exchange between the head end 101, and the terminal apparatus A111, the terminal apparatus B112, and the terminal apparatus C113. A frequency band of 130 MHz~864 MHz is allocated to In-Band to be mainly used for broadcast channels including video and audio. QPSK is employed for OOB, whereas QAM64 is employed for In-Band as modulation techniques. A detailed description of modulation techniques is omitted here, since they are publicly known techniques which are less related to the present invention. FIG. 4 shows a more specific example of how the OOB frequency band is used. A frequency band of 70 MHz~74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz~10.1 MHz is used to transmit data from the terminal apparatus A111 to the head end 101. A frequency band of 10.1 MHz~10.2 MHz is used to transmit data from the terminal apparatus B112 to the head end 101. A frequency band of 10.2 MHz~10.3 MHz is used to transmit data from the terminal apparatus C113 to the head end 101. Accordingly, data which is unique to each terminal apparatus can be transmitted to the head end 101 from the terminal apparatus A111, the terminal apparatus B112, and the terminal apparatus C113. FIG. 5 shows an example use of the In-Band frequency band. Frequency bands of 150~156 MHz and 156~162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the transport packet format compliant with the MPEG-2 specification, in which case data intended for various data broadcasting systems can be transmitted, in addition to audio and video data.

The head end 101 is equipped with a QPSK modulation unit, a QAM modulation unit, and the like in order to transmit suitable broadcast signals to the respective frequency ranges. Moreover, the head end 101 is equipped with a QPSK demodulation unit for receiving data from the terminal apparatuses. Also, the head end 101 is assumed to be further equipped with various devices related to the above modulation units and demodulation unit. However, detailed descriptions for these are omitted here, since the present invention is mainly related to the terminal apparatuses.

The terminal apparatus A111, the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to each terminal apparatus to the head end 101. In the present embodiment, these three terminal apparatuses have the same configuration.

Figure 6:
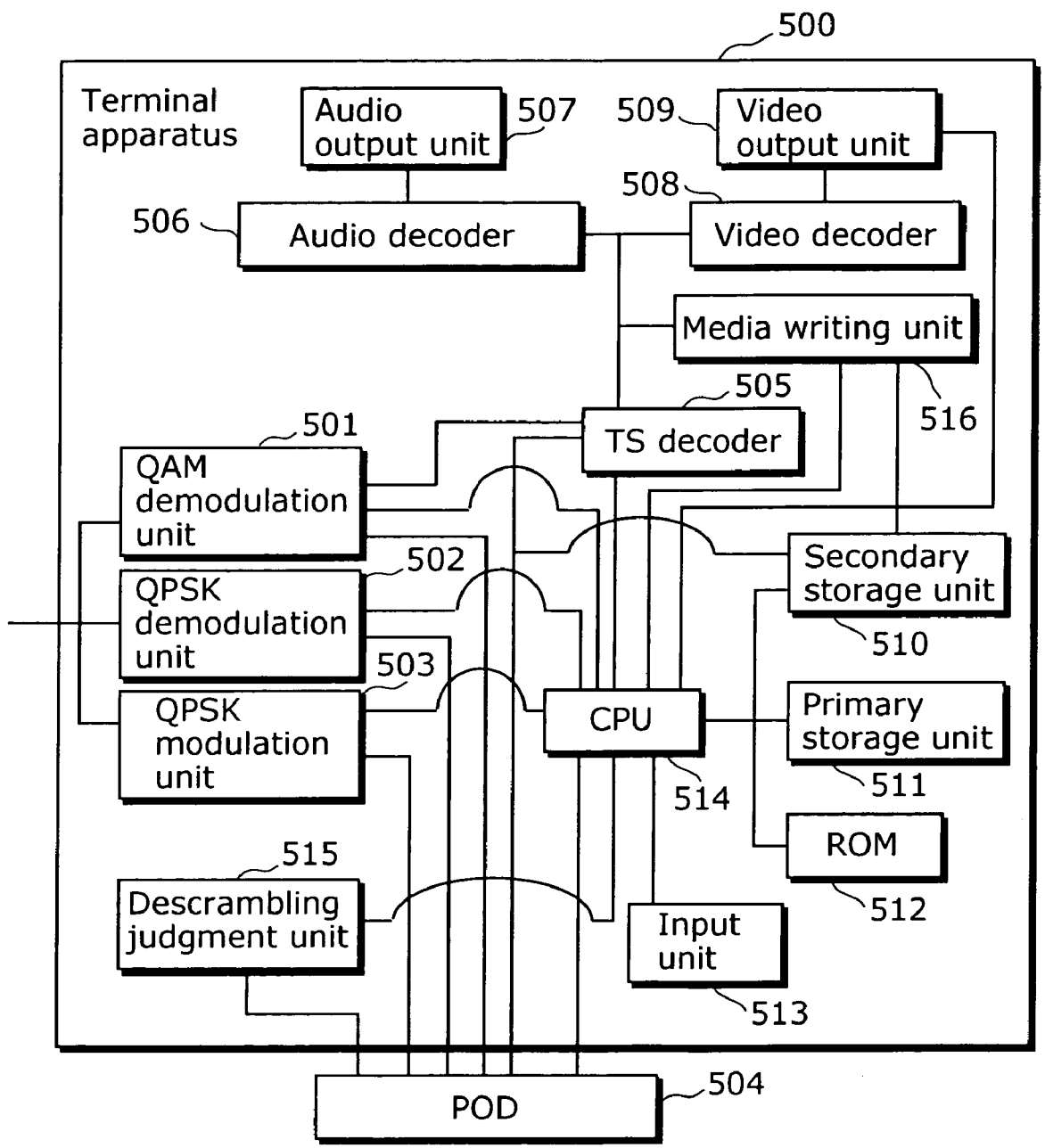
FIG. 6 is a structure diagram of the terminal apparatus in the cable television system according to the present invention.

FIG. 6 is a block diagram showing a hardware configuration of the terminal apparatus (digital broadcast recording apparatus). A terminal apparatus 500 includes a QAM demodulation unit 501, a QPSK demodulation unit 502, a QPSK modulation unit 503, a TS decoder 505, an audio decoder 506, a audio output unit 507, a video decoder 508, a video output unit 509, a secondary storage unit 510, a primary storage unit 511, a ROM 512, an input unit 513, a CPU 514, a descrambling judgment unit 515, and a media writing unit 516. Furthermore, a POD 504 can be attached to/detached from the terminal apparatus 500.

Figure 7:
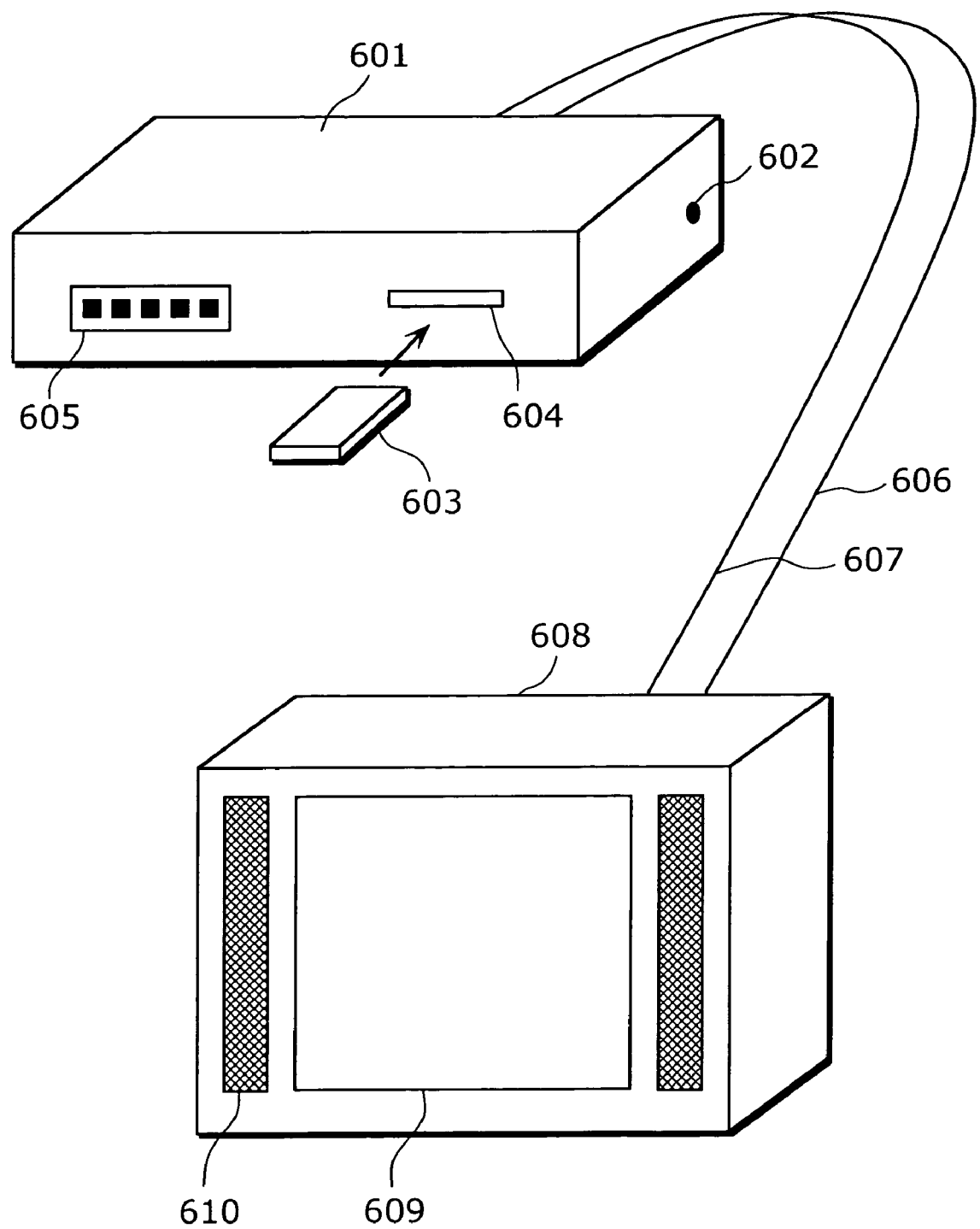
FIG. 7 shows an example of the external appearance of the terminal apparatus in the cable television system according to the present invention.

FIG. 7 shows a digital broadcast receiving terminal and a television which are an example of the external appearance of the terminal apparatus 500.

A terminal apparatus 601 contains within its housing, all constituent elements of the terminal apparatus 500 except for the POD 504.

A signal input terminal 602 is connected with a cable line in order to perform transmission/reception of signals to and from the head end 101. In addition, the signal input terminal 602 is connected with the QAM demodulation unit 501, the QPSK demodulation unit 502, and the QPSK modulation unit 503 in FIG. 6.

A POD card 603 is a POD card corresponding to the POD 504 in FIG. 6. The POD 504 is embodied independently of the terminal apparatus 500 and can be attached to/detached from the terminal apparatus 500, as in the case of the POD card 603 in FIG. 7. A detailed description of the POD 504 is given later.

An insertion slot 604 is an insertion slot into which the POD card 603 is inserted.

A front panel 605 is composed of plural buttons, and corresponds to the input unit 513 in FIG. 6. One button in the front panel 605 is an eject button which is pressed when ejecting the POD card 603. By pressing the eject button, the POD 603 can be ejected.

A video cable 606 is a cable which conveys the video output from the terminal apparatus 601 to a television 608. The video cable 606 is connected to the video output unit 509 in FIG. 6. The audio cable 607 is a cable which conveys the audio output from the terminal apparatus 601 to a television 608. The audio cable 607 is connected to the audio output unit 507 in FIG. 6.

The television 608 includes a display 609 and a speaker 610 within its housing, and outputs via the display 609 and the speaker 610, respectively, the video output and audio output from the terminal apparatus 601 which are received as data through the video cable 606 and the audio cable 607.

Referring to FIG. 6, the QAM demodulation unit 501 demodulates a signal which has been QAM-modulated in and transmitted from the head end 101, according to tuning information that includes a frequency specified by the CPU 514, and passes the result to the POD 504 or the TS decoder 505 which is designated by the CPU.

The QPSK demodulation unit 502 demodulates a signal which has been QPSK-modulated in and transmitted from the head end 101, according to tuning information that includes a frequency specified by the CPU 514, and passes the result to the POD 504.

The QPSK modulation unit 503 QPSK-demodulates the signal passed from the POD 504, according to demodulation information that includes a frequency specified by the CPU 514, and transmits the result to the head end 101.

As shown in FIG. 7, the POD 504 is detachable from the main body of the terminal apparatus 500. The definition of the connection interface between the main body of the terminal 500 and the POD 504 is given in the OpenCable (™) HOST-POD Interface Specification (OC-SP-HOSTPOD-IF-I12-030210) and specifications referred to by such specification. Here, a detailed description is omitted, and a description is given only for portions relevant to the present invention.

Figure 8:
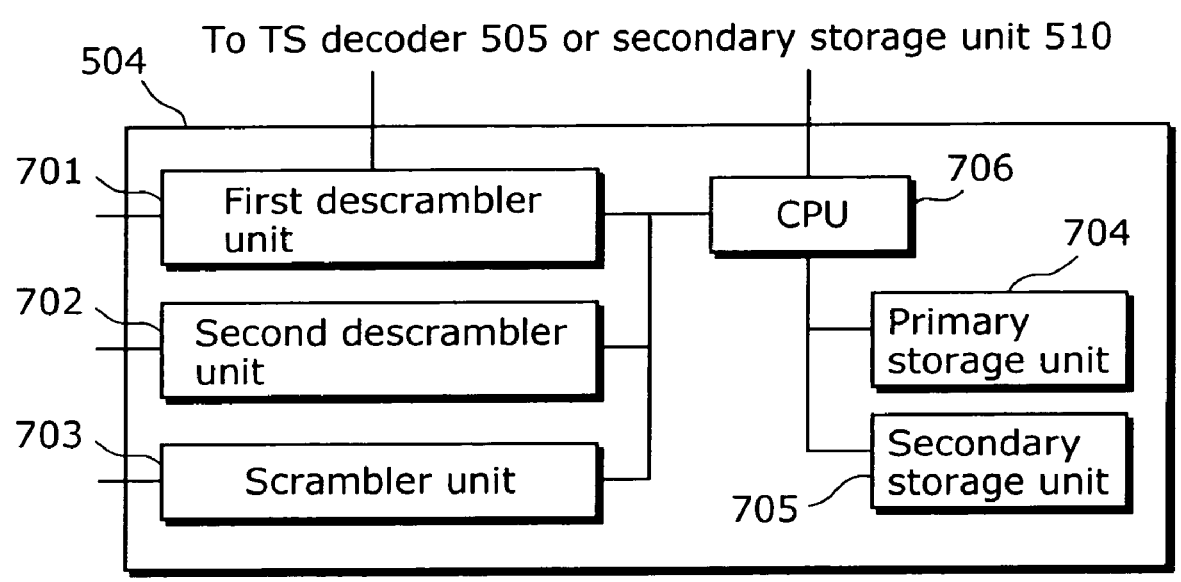
FIG. 8 is a structure diagram showing the hardware structure of the POD according to the present invention.

FIG. 8 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

The first descrambler unit 701, under instruction from the CPU 706, receives a scrambled signal from the QAM demodulation unit 501 of the terminal apparatus 500 and descrambles such signal. Then, the first descrambler unit 701 transmits the descrambled signal to the TS decoder 505 and the secondary storage unit 510 of the terminal apparatus 500. Information required for decoding such as a key is provided by the CPU 706 as necessary. More specifically, the head end 101 broadcasts several pay channels, and when the user purchases the right to view these pay channels, the first descrambler unit 701 receives required information such as a key from the CPU 706 and performs descrambling, and the user is able to view these pay channels. When required information such as a key is not provided, the first descrambler unit 701 passes the received signal directly to the TS decoder 505 and the secondary storage unit 510 without performing descrambling.

The second descrambler unit 702, under instruction from the CPU 706, receives a scrambled signal from the QPSK demodulation unit 502 of the terminal apparatus 500 and descrambles such signal. Then, the second descrambler unit 702 passes the descrambled data to the CPU 706.

The scrambler unit 703, under instruction from the CPU 706, scrambles the data received from the CPU 706 and sends the result to the QPSK modulation unit 503 of the terminal apparatus 500.

The primary storage unit 704, specifically made up of a primary memory such as a RAM, is utilized for storing data temporarily when the CPU 706 performs processing.

The secondary storage unit 705, specifically made up of a secondary storage memory such as a flash ROM, is utilized for storing a program to be executed by the CPU 706 as well as for storing data which should not be deleted even when the power is turned off.

Figure 9:
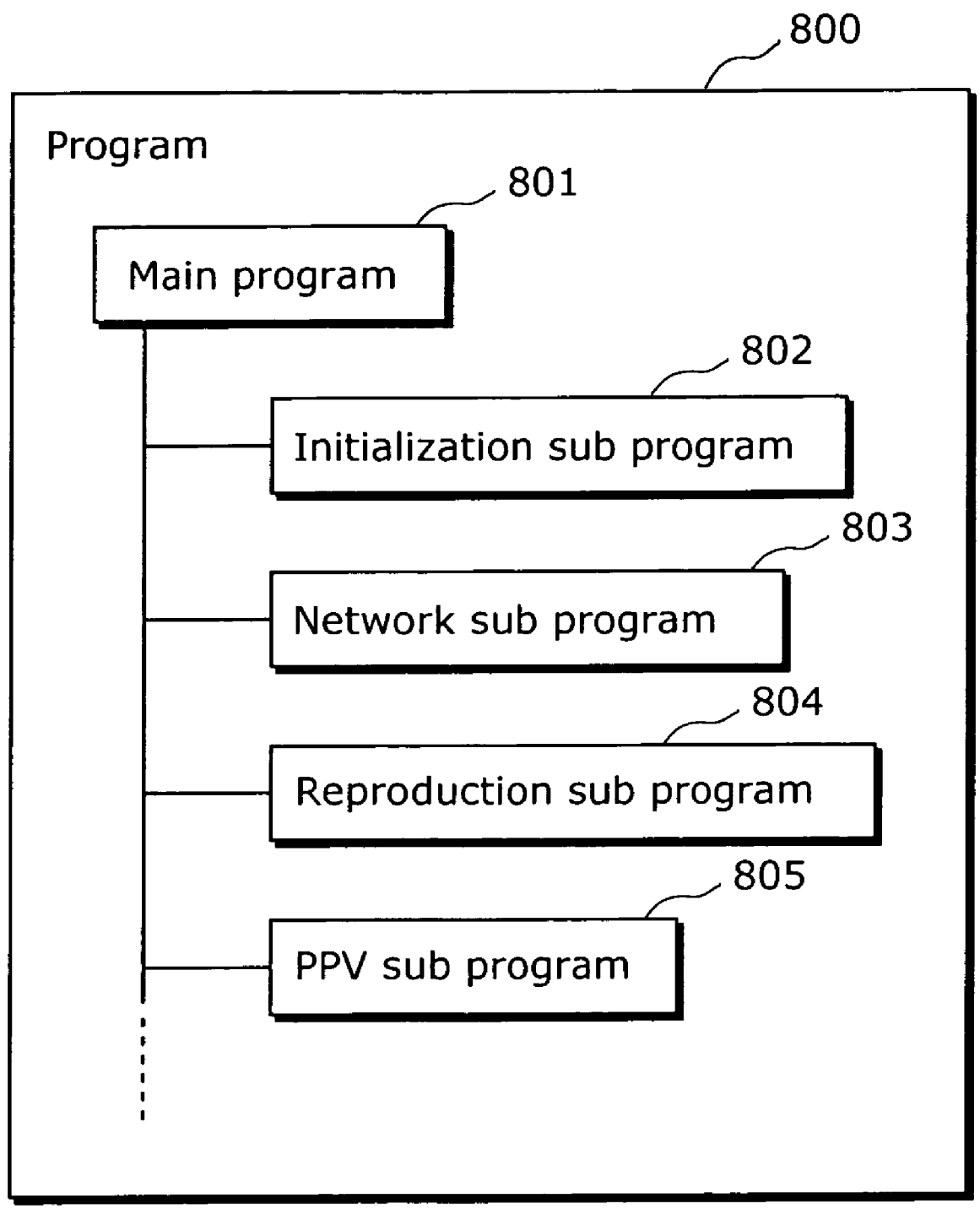
FIG. 9 is a structure diagram showing the program structure stored by the POD according to the present invention.

The CPU 706 sends a descrambling-not-possible message to the descrambling judgment unit 515 in FIG. 6, when descrambling in the first descrambler unit 701 or the second descrambler unit 702 becomes not possible. More specifically, the case where keys (a first key and a second key) stored in the POD 504 become invalid due to the expiration of the user's contract term, and the case where a descrambling key (a fourth key: retrieved from data included in the Out Of Band, using the QPSK demodulation unit 502, and stored within the POD 504) used in descrambling and sent from the head end cannot be acquired due to communication problems such as communication noise, and descrambling in the first descrambler unit 701 or the second descrambler unit 702 is not carried out. In addition, the CPU 706 executes the program stored by the secondary storage unit 705. The program is made up of plural subprograms. FIG. 9 shows an example of the program stored by the secondary storage unit 705. In FIG. 9, a program 800 is made up of plural subprograms including a main program 801, an initialization subprogram 802, a network subprogram 803, a reproduction subprogram 804, and a PPV subprogram 805.

Here, PPV, which is an abbreviation of Pay Per View, refers to a service that allows the user to view a certain program such as a movie, on a charge basis. When the user enters his personal identification number, the purchase of the right to view the program is notified to the head end 101, scrambling is cancelled, and such program can be viewed by the user. With this viewing, the user is required to pay the purchase price at a later date.

The main program 801, which is the subprogram activated first by the CPU 706 when the power is turned on, controls the other subprograms.

The initialization subprogram 802, which is activated by the main program 801 when the power is turned on, performs information exchange with the terminal apparatus 500 and performs initialization. The details of this initialization is defined in detail in the OpenCable (™) HOST-POD Interface Specification (OC-SP-HOSTPOD-IF-I12-030210) and in specifications referred to by such specification. Furthermore, the initialization subprogram 802 also performs initialization not defined in these specifications. Here, a part of such initialization is introduced. When the power is turned on, the initialization subprogram 802 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the secondary scrambler unit 702. Moreover, the initialization subprogram 802 provides the secondary descrambler unit 702 with descrambling information such as a first key stored in the secondary storage unit 705. As a result, the secondary descrambler unit 702 performs descrambling and passes the result to the CPU 706 executing the initialization subprogram 802. As such, the initialization subprogram 802 can receive the information. In the present embodiment, the initialization subprogram 802 receives information via the network subprogram 803. A detailed description on this is given later.

Furthermore, the initialization subprogram 802 notifies the QPSK modulation unit 503 of a second frequency stored in the secondary storage unit 705 via the CPU 514 of the terminal apparatus 500. The initialization subprogram 802 provides the scrambler unit 703 with scrambling information (for example, an algorithm, program or the like, necessary for scrambling) stored in the secondary storage unit 705. When the initialization subprogram 802 provides, via the network subprogram 803, the scrambler unit 703 with information required to be sent, the scrambler unit 703 scrambles the data using the provided scrambling information, and provides the scrambled data to the QPSK modulation unit 503. The QPSK modulation unit 503 modulates the scrambled information which it received, and sends the modulated information to the head end 101.

As a result, it becomes possible for the initialization subprogram 802 to carry out a two-way communication with the head end 101 via the terminal apparatus 500, the secondary descrambler unit 702, the scrambler unit 703, and the network subprogram 803.

The network subprogram 803, which is used by plural subprograms such as the main program 801 and the initialization subprogram 802, is a subprogram intended for carrying out a two-way communication with the head end 101. More specifically, the network subprogram 803 behaves as if other subprograms using the network subprogram 803 were carrying out a two-way communication with the head end 101 in accordance with TCP/IP. A detailed description of TCP/IP is omitted here, since it is a publicly known technique for specifying the protocols to be used when exchanging information between plural terminals. When activated by the initialization subprogram 802 at power-on time, the network subprogram 803 notifies, via the terminal apparatus 500, the head end 101 of an MAC address (an abbreviation of Media Access Control address) which is an identifier for identifying the POD 504 and which is stored in the secondary storage unit 705 beforehand, so as to request for the obtainment of an IP address. The head end 101 notifies the POD 504 of the IP address via the terminal apparatus 500, and the network subprogram 803 stores such IP address in the primary storage unit 704. From here on, the head end 101 and the POD 504 communicate with each other using such IP address as the identifier of the POD 504.

The reproduction subprogram 804 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction subprogram 804 receives, via the network subprogram 803, information indicating that the signal inputted in the first descrambler unit 701 is a PPV channel. On the notification that the signal is a PPV channel, the reproduction subprogram 804 activates the PPV subprogram 805.

When activated, the PPV subprogram 805 displays, on the television 608 via the terminal apparatus 500, a message that prompts the user to purchase the program, and accepts an input from the user. More specifically, when information intended to be displayed on the screen is sent to the CPU 514 of the terminal apparatus 500, a program running on the CPU 514 of the terminal apparatus 500 sends video data for displaying the message, to the video output unit 509 of the terminal apparatus 500, and displays the message on the display 609 of the television 608. Then, when the user enters the personal identification number via the input unit 513 of the terminal apparatus 500, the CPU 514 of the terminal apparatus 500 accepts it, and sends it to the PPV subprogram 805 running on the CPU 706 of the POD 504. The PPV subprogram 805 sends, to the head end 101, the accepted personal identification number via the network subprogram 803. When such personal identification number is valid, the head end 101 notifies, via the network subprogram 803, the PPV subprogram 805 of descrambling information required for descrambling such as a fourth key (in addition to the fourth key, it is also possible to include a descrambling algorithm or a descrambling program which use the fourth key). The PPV subprogram 805 provides the first descrambler unit 701 with the accepted descrambling information such as the fourth key, and then the first descrambler unit 701 descrambles the signal being inputted.

Figure 10:
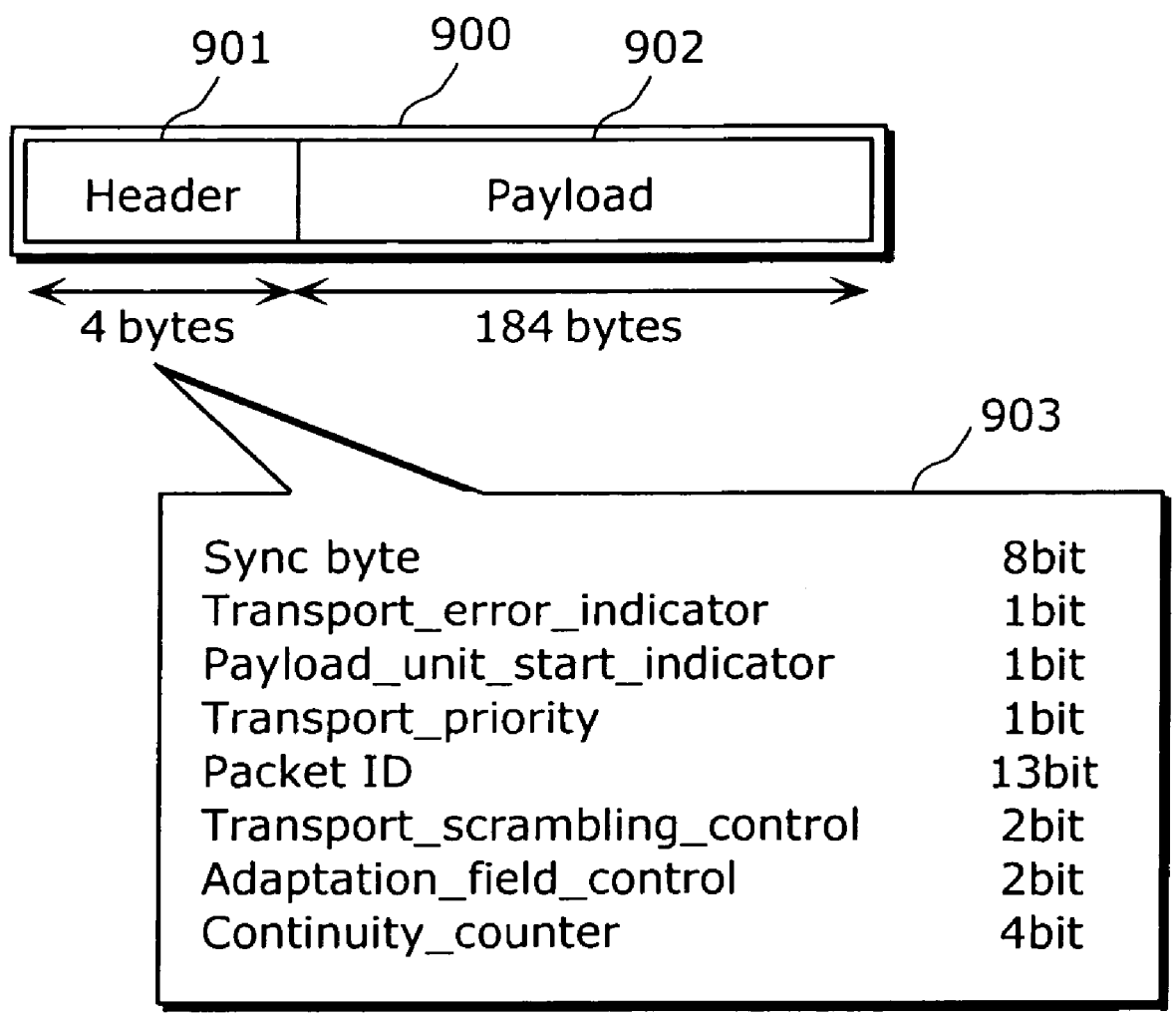
FIG. 10 is a structure diagram of the packet defined in the MPEG Specification.
Figure 11:
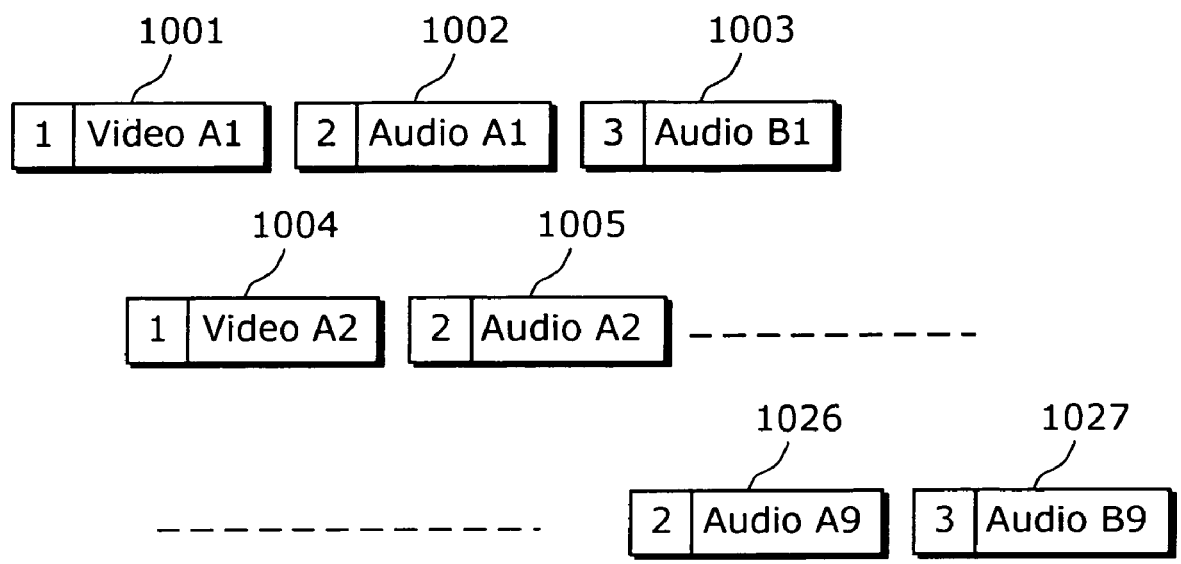
FIG. 11 shows an example of an MPEG-2 transport stream.

Referring to FIG. 6, the TS decoder 505 performs filtering on the signal accepted from the POD 504, and passes necessary data to the audio decoder 506, the video decoder 508, and the CPU 514. Here, the signal sent from the POD 504 is an MPEG-2 transport stream. A detailed description about an MPEG-2 transport stream is given in the MPEG specification ISO/IEC138181-1, and therefore detailed description is omitted in the present embodiment. An MPEG-2 transport stream is composed of plural fixed-length packets, and a packet ID is assigned to each packet. FIG. 10 is a diagram showing the structure of a packet. 900 is a packet structured by 188 bytes having fixed length. The top four bytes is a header 901 storing information for identifying the packet, and the remaining 184 bytes is a payload 902 which contains the information to be transmitted. 903 shows the breakdown of the header 901. A packet ID is included in the 13 bits of the twelfth to twenty-fourth bits from the top. FIG. 11 is a schematic diagram illustrating plural packet strings to be transmitted. A packet 1001 carries a packet ID "1" in its header and includes the first information of video A in its payload. A packet 1002 carries a packet ID "2" in its header and includes the first information of audio A in its payload. A packet 1003 carries a packet ID "3" in its header and includes the first information of audio B in its payload.

A packet 1004 carries the packet ID "1" in its header and includes the second information of the video A in its payload, and is the continuation of the packet 1001. Similarly, packets 1005, 1026, and 1027 carry follow-on data of the other packets. By concatenating the contents of the payloads of packets with the same packet IDs in the above manner, it is possible to reproduce a continuing video and audio.

Referring to FIG. 11, when the CPU 514 indicates, to the TS decoder 505, the packet ID "1" as well as "the video decoder 508" as an output destination, the TS decoder 505 extracts packets with the packet ID "1" from the MPEG-2 transport stream received from the POD 504, and passes them to the video decoder 508. In FIG. 11, therefore, only the video data is passed over to the video decoder 508. At the same time, when the CPU 514 indicates, to the TS decoder 505, the packet ID "2" as well as "the audio decoder 506", the TS decoder 505 extracts packets with the packet ID "2" from the MPEG-2 transport stream received from the POD 504, and passes them to the audio decoder 506. In FIG. 11, only the audio data is passed over to the video decoder 508.

This process of extracting only necessary packets according to the packet IDs corresponds to the filtering performed by the TS decoder 505. The TS decoder 505 is capable of performing more than one filtering simultaneously, at the instruction of the CPU 514.

Referring to FIG. 6, the audio decoder 506 concatenates audio data embedded in the packets in the MPEG-2 transport stream provided by the TS decoder 505, performs digital-to-analog conversion on the concatenated data, and outputs the result to the audio output unit 507.

The audio output unit 507 outputs the signal provided by the audio decoder 506.

The video decoder 508 concatenates video data embedded in the packets in the MPEG-2 transport stream provided by the TS decoder 505, performs digital-to-analog conversion on the concatenated data, and outputs the result to the video output unit 509.

The video output unit 509 outputs the signal provided by the video decoder 508.

The secondary storage unit 510 is a re-writable storage unit, and is specifically made up of a flash memory or a hard disk and the like, stores and deletes data and programs specified by the CPU 514. Stored data and programs are referred to by the CPU 514. The stored data and programs are kept in storage even when power to the terminal apparatus 500 is cut off.

The primary storage unit 511, specifically made up of a RAM and the like, temporarily stores and deletes data and programs specified by the CPU 514. Stored data and programs are referred to by the CPU 514. The stored data and programs are deleted when power to the terminal apparatus 500 is cut off.

The ROM 512 is a read-only memory device, specifically made up of are a ROM, a CD-ROM, or a DVD, and the like. The ROM 512 stores a program to be executed by the CPU 514.

Figure 12:
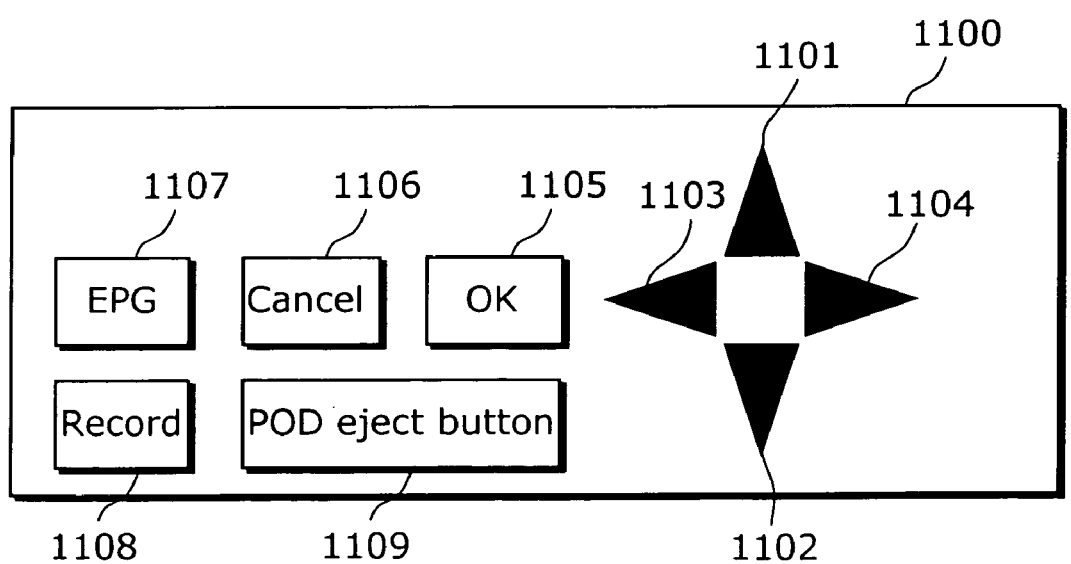
FIG. 12 shows and example of the external appearance in the case where the input unit is structured as a front panel.

The input unit 513, specifically made up of a front panel or remote control, accepts an input from the user. FIG. 12 shows an example of the input unit 513 in the case where it is configured in the form of a front panel. 1100 is a front panel, which corresponds to the front panel unit 603 shown in FIG. 7. Such front panel 1100 includes nine buttons, namely, an up-cursor button 1101, a down-cursor button 1102, a left-cursor button 1103, a right-cursor button 1104, an OK button 1105, a cancel button 1106, an EPG button 1107, a record button 1108, and a POD eject button 1109. When the user presses down a button, the identifier of such pressed button is notified to the CPU 514.

The CPU 514 executes the program stored in the ROM 512. Following the instructions from such program to be executed, the CPU 514 controls the QAM demodulation unit 501, the QPSK demodulation unit 502, the QPSK modulation unit 503, the POD 504, the TS decoder 505, the video output unit 509, the secondary storage unit 510, the primary storage unit 511, the ROM 512, the descrambling judgment unit 515, and the media writing unit 516.

The descrambling judgment unit 515 is an apparatus or a program for judging whether or not conditions for descrambling a channel designated by the CPU are satisfied. More specifically, it judges whether or not the POD 504 is physically inserted into the terminal 500, and judges the conditions for whether or not descrambling is possible according to the descrambling-not-possible message received from the CPU 706 of the POD 504.

The media writing unit 516 is a drive for re-writable media, which receives a write instruction from the CPU 514, and writes data stored in the secondary storage unit 510 onto a medium. More specifically, it is a drive for a flash memory such as a DVD-RAM, a DVD-R, a DVD-RW+, a DVD-RW-, a Blue-ray Disc, a CR-R, a USB flash memory, and a SD memory card.

Furthermore, although in FIG. 6, the media writing unit 516 is provided inside the terminal apparatus 500, the media writing unit 516 may also be provided outside the terminal apparatus 500 and connected to the terminal apparatus 500 via wiring, and the like. In this case, aside from the above-mentioned media located outside the terminal apparatus 500, it is possible for the media writing unit 516 to write the data stored in the secondary storage unit 510, into a hard disk which can be written into by the media writing unit 516.

Figure 13:
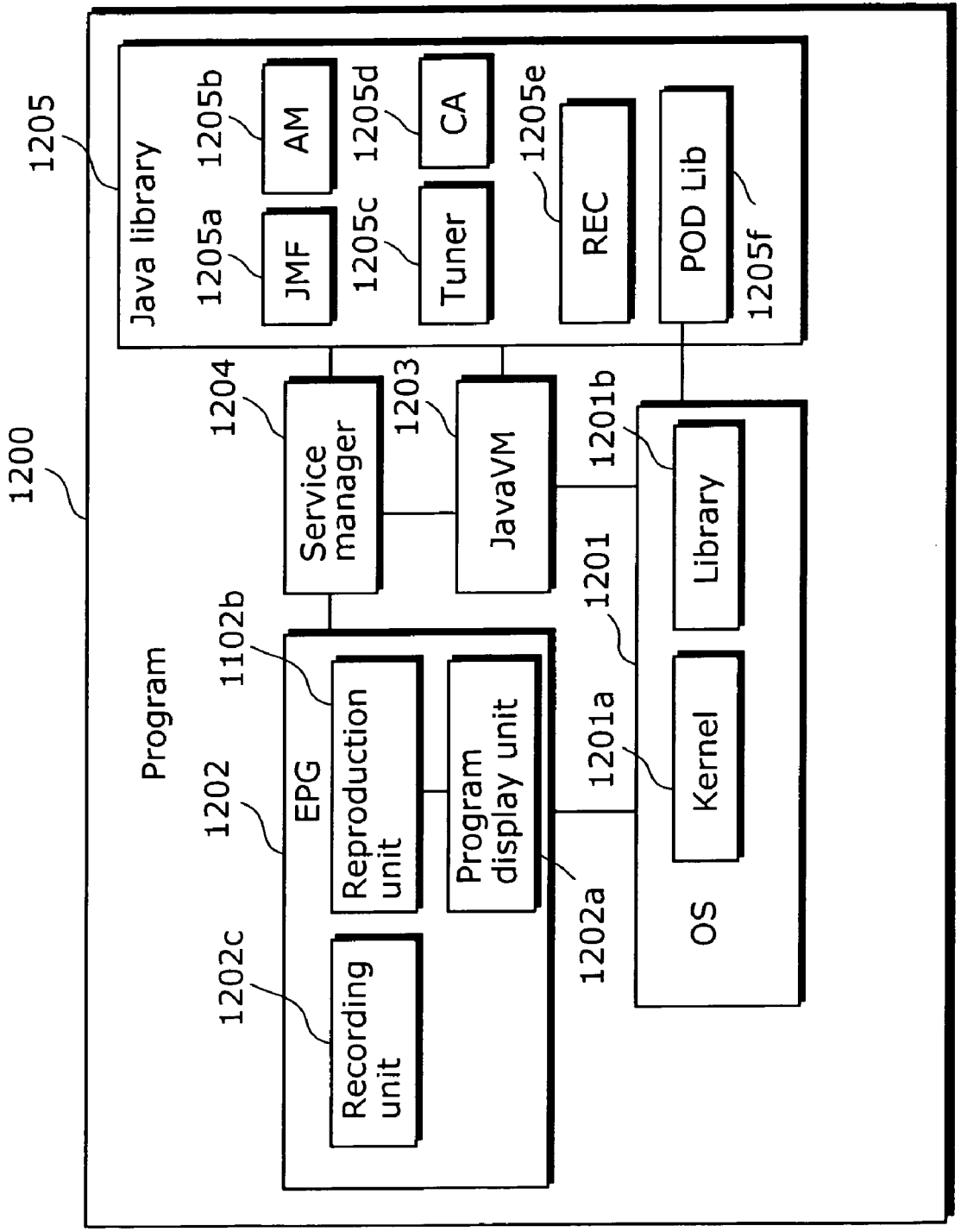
FIG. 13 is a structure diagram showing the program structure stored by the terminal apparatus according to the present invention.

FIG. 13 is a diagram showing an example of the structure of the program stored in the ROM 512 and executed by the CPU 514.

A program 1200 is made up of plural subprograms, and more specifically, is made up of an OS 1201, an EPG 1202, a Java (trademark) VM 1203, a service manager 1204, and a Java library 1205.

The OS 1201 is a subprogram activated by the CPU 514 when power to the terminal apparatus 500 is turned on. The OS 1201 stands for operating system, an example of which is Linux and the like. The OS 1201 is a generic name for publicly known technology made up of a kernel 1201a for executing a subprogram in parallel with another subprogram and of a library 1201b, and therefore a detailed description is omitted. In the present embodiment, the kernel 1201a of the OS 1201 executes the EPG 1202 and the Java VM 1203 as subprograms. Meanwhile, the library 1201b provides these subprograms with plural functions (for example, mathematical functions) required for controlling the constituent elements of the terminal apparatus 500.

As an example of such functions, tuning, recording, media writing, and time obtainment are described. In the tuning function, tuning information including a frequency is received from another subprogram and then passed over to the QAM demodulation unit 501. Accordingly, it is possible for the QAM demodulation unit 501 to perform demodulation based on the provided tuning information, and pass the demodulated data to the POD 504 and the TS decoder 505. As a result, the other subprograms can control the QAM demodulation unit via the library 1201b.

In the recording function, a record instruction or a terminate-recoding instruction is received from another subprogram and passed on to the CPU 514. In the case where the program which is the subject of recording (hereinafter referred to as a recording-subject-program) is not scrambled, the CPU 514 receiving the record instruction stores the data demodulated by the QAM demodulation unit 501 into the secondary storage unit 510. In the case where the recording-subject-program is scrambled, the data demodulated by the POD 504 is stored in the secondary storage unit 510. As a result, another subprogram can hold a designated program (television program) in the secondary storage unit, through the library 1201*b*. Upon receiving the terminate-recording instruction, the CPU 514 terminates the above-mentioned storing.

In the media writing function, recording information and writing information stored in the secondary storage unit 510 are received from another subprogram, and the recording-subject-program stored in the secondary storage unit 510 is sent to the media writing unit 516 for writing into a medium. As a result, it is possible for another subprogram to control the media writing unit 516, through the library 1201*b*, and write the recording-subject-program stored in the secondary storage unit 510 into a medium inserted in the media writing unit 516.

The time obtainment function is a function for obtaining the present time.

Figure 14A:
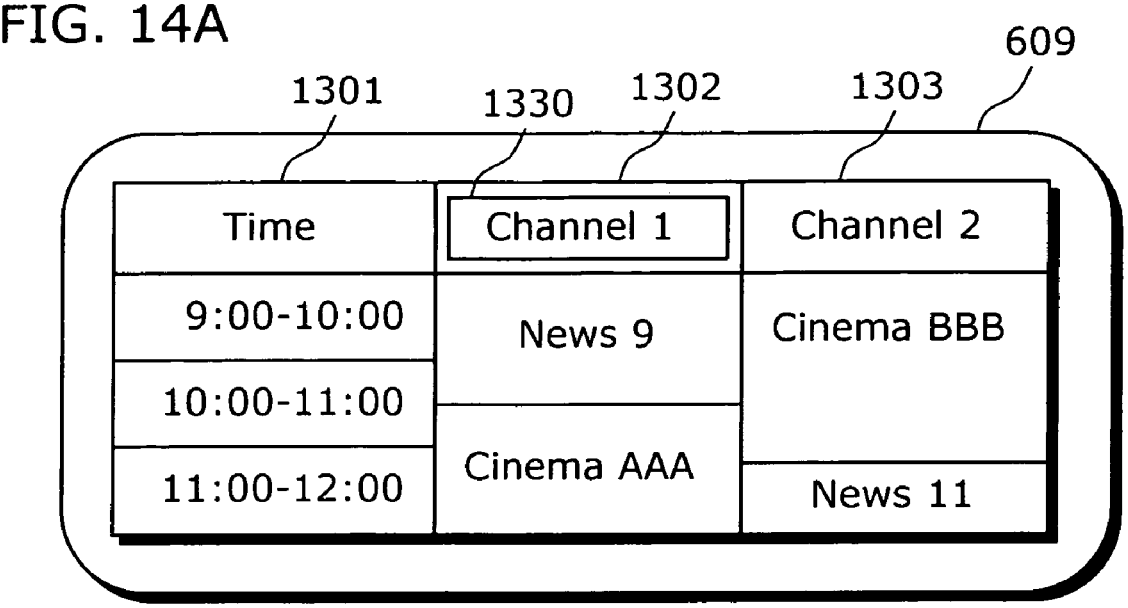
FIG. 14A shows an example of a screen display of the display according to the present invention.
Figure 14B:
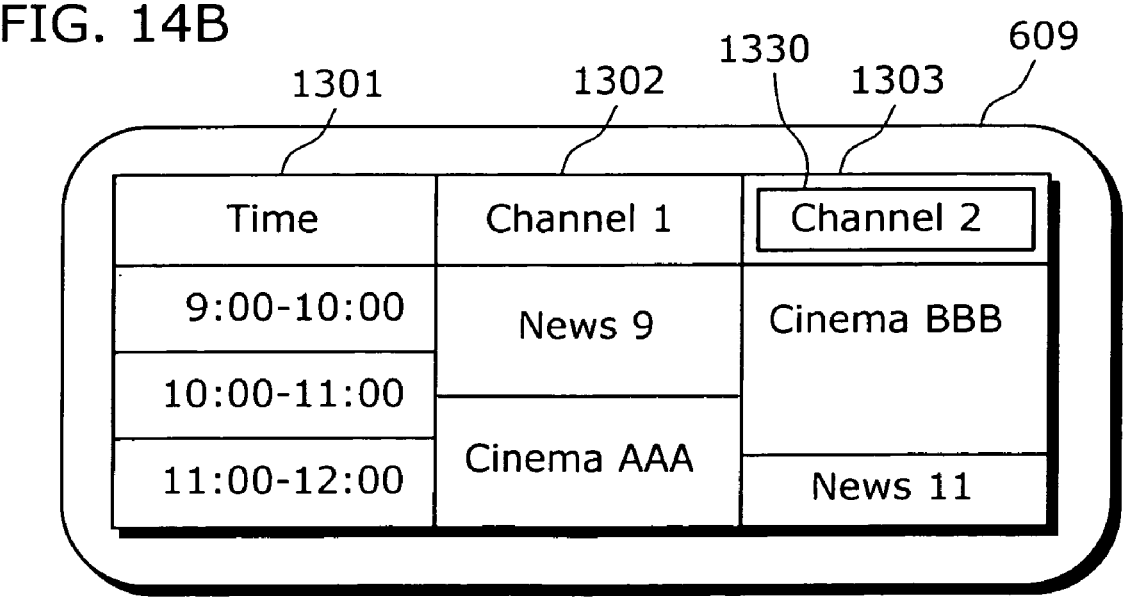
FIG. 14B shows an example of a screen display of the display according to the present invention.

The EPG 1202 is made up of a program display unit 1202*a* for displaying a list of programs to the user as well as for accepting an input from the user, a reproduction unit 1202*b* for selecting channels, and a recording unit 1202*c* for recording. Here, EPG is an abbreviation of Electronic Program Guide. The EPG 1202 gets activated when power to the terminal apparatus 500 is turned on. In the activated EPG 1202, the program display unit 1202*a* waits for an input from the user via the input unit 513 of the terminal apparatus 500. Here, in the case where the input unit 513 takes the form of the front panel illustrated in FIG. 12, when the user presses down the EPG button 1107 on the input unit 513, the CPU 514 is notified of the identifier of such EPG button. The program display unit 1202*a* of the EPG 1202, which is a subprogram running on the CPU 514, accepts this identifier and displays program information on the display 609 via the video output unit 509. FIG. 14A and FIG. 14B show examples of a program table displayed on the display 609. Referring to FIG. 14A, the program information is displayed on the display 609 in a grid pattern. A column 1301 describes time information. A column 1302 describes a channel name "Channel 1" and programs to be broadcast during time periods corresponding to the respective times described in the column 1301. It is shown that a program "News 9" is broadcast from 9:00 to 10:30, and "Cinema AAA" is broadcast from 10:30 to 12:00 on "Channel 1". A column 1303 describes a channel name "Channel 2" and programs to be broadcast during time periods corresponding to the respective times described in the column 1301, as in the case of the column 1302. A program "Cinema BBB" is broadcast from 9:00 to 11:00, and "News 11" is broadcast from 11:00 to 12:00. 1330 is a cursor. The cursor 1330 moves at the press of the left-cursor 1103 or the right-cursor 1104 on the front panel 1100. When the right-cursor 1104 is pressed down in the state illustrated in FIG. 14A, the cursor 1330 moves towards the right as shown in FIG. 14B. Meanwhile, when the left-cursor 1103 is pressed down in the state illustrated in FIG. 14B, the cursor 1330 moves towards the left as shown in FIG. 14A.

Figure 15A:
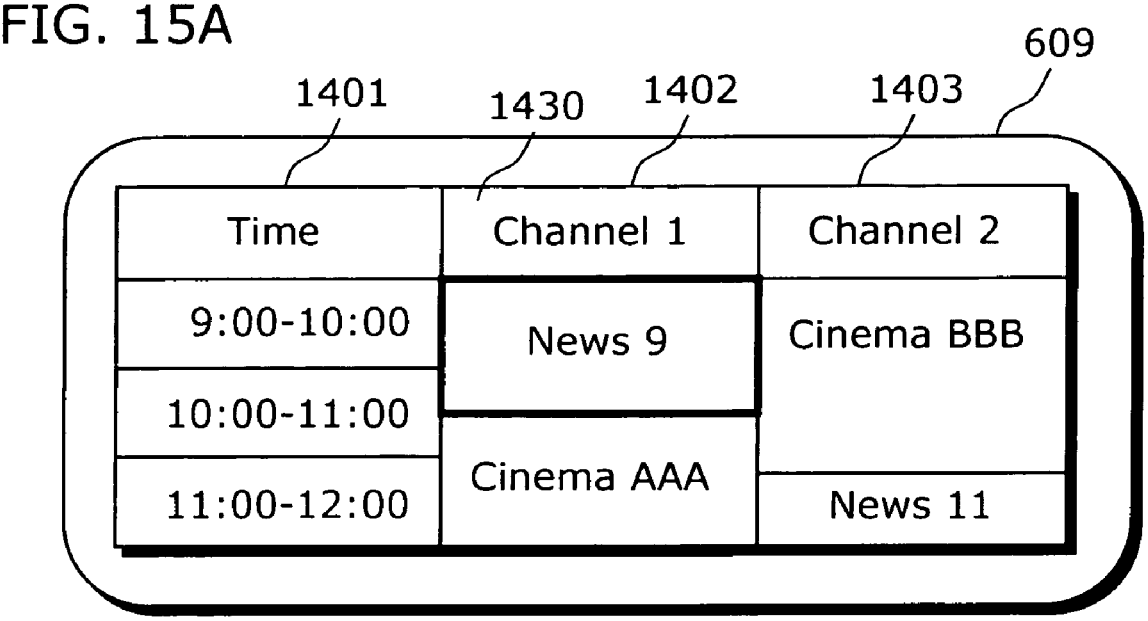
FIG. 15A shows an example of a screen display of the display according to the present invention.
Figure 15B:
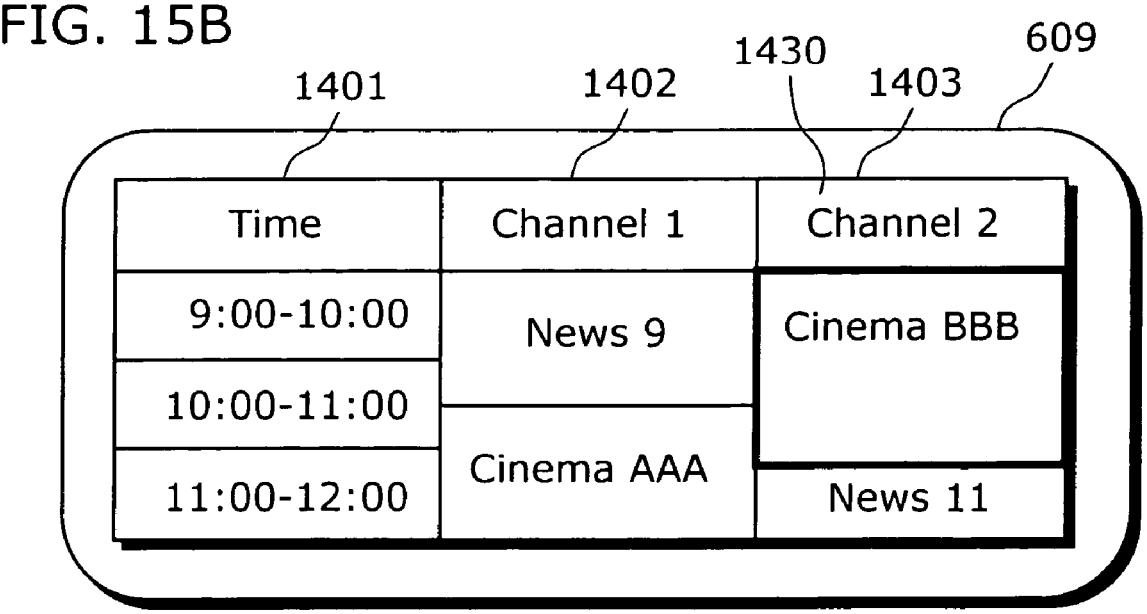
FIG. 15B shows an example of a screen display of the display according to the present invention.

When the OK button 1105 on the front panel 1100 is pressed down in the state shown in FIG. 14A, the program display unit 1202*a* notifies the reproduction unit 1202*b* of the identifier of "Channel 1". Meanwhile, when the OK button 1105 on the front panel 1100 is pressed down in the state shown in FIG. 14B, the program display unit 1202*a* notifies the reproduction unit 1202*b* of the identifier of "Channel 2". In addition, when the user presses down the record button 1108 on the input unit 513, the CPU 514 is notified of the identifier of the record button. The program display unit 1202*a* of the EPG 1202, which is a subprogram running on the CPU 514, accepts this identifier and displays program information on the display 609. FIG. 15A and FIG. 15B show examples of a program table displayed on the display 609. Referring to FIG. 15A, the program information is displayed on the display 609 in a grid pattern. A column 1401 describes time information. A column 1402 describes a channel name "Channel 1" and programs to be broadcast during time periods corresponding to the respective times described in the column 1401. It is shown that a program "News 9" is broadcast from 9:00 to 10:30, and "Cinema AAA" is broadcast from 10:30 to 12:00 on "Channel 1". A column 1403 describes a channel name "Channel 2" and programs to be broadcast during time periods corresponding to the respective times described in the column 1401, as in the case of the column 1402. A program "Cinema BBB" is broadcast from 9:00 to 11:00, and "News 11" is broadcast from 11:00 to 12:00. 1330 is a focus frame. The focus frame 1430 moves at the press of the up-cursor button 1101, the down-cursor button 1102, the left-cursor 1103 or the right-cursor 1104 on the front panel 1100. When the right-cursor 1104 is pressed down in the state illustrated in FIG. 15A, the focus frame 1430 moves towards the right as shown in FIG. 15B. Meanwhile, when the left-cursor 1103 is pressed down in the state illustrated in FIG. 15B, the focus frame 1330 moves towards the left as shown in FIG. 15A.

When the OK button 1105 on the front panel 1100 is pressed down in the state shown in FIG. 15A, the program display unit 1202*a* notifies the record unit 1202*c* of the identifier of "Channel 1" as well as the start time and end time for "News 9". Meanwhile, when the OK button 1105 on the front panel 1100 is pressed down in the state shown in FIG. 14B, the program display unit 1202*a* notifies the reproduction unit 1202*b* of the identifier of "Channel 2" as well as the start time and end time for "Cinema BBB".

Furthermore, the program display unit 1202*a* periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 1107 of the input unit 513.

Figure 16:
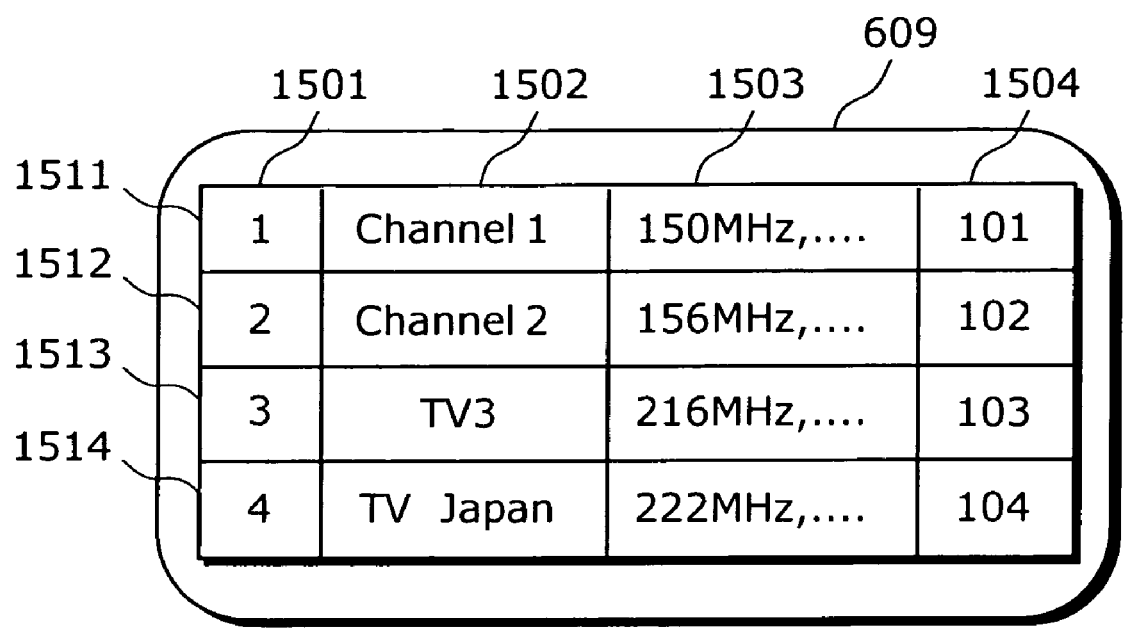
FIG. 16 shows an example of information stored by the secondary storage unit according to the present invention.

The reproduction unit 1202*b* reproduces the channel using the received identifier of the channel. The relationship between channel identifiers and channels is pre-stored by the secondary storage unit 510 as channel information. FIG. 16 shows an example of the channel information stored in the secondary storage unit 510. The channel information is stored in tabular form. A column 1501 describes the identifiers of channels. A column 1502 describes channel names. A column 1503 describes tuning information. Here, the tuning information is represented by values to be provided to the QAM demodulation unit 501 such as frequency, transmission rate, and coding ratio. A column 1504 describes program numbers. Program numbers are numbers used to identify PMTs defined by the MPEG-2 standard. A description about PMT is given later. Each of lines 1511~1514 indicates a set of the identifier, channel name, and tuning information of each channel. The line 1511 describes a set that includes "1" as an identifier, "Channel 1" as a channel name, a frequency of "312 MHz" as tuning information, and "101" as a program number. The reproduction unit 1202*b* passes the identifier and the reproduce instruction of the received channel to the service manager in order to reproduce the channel.

Figure 17A:
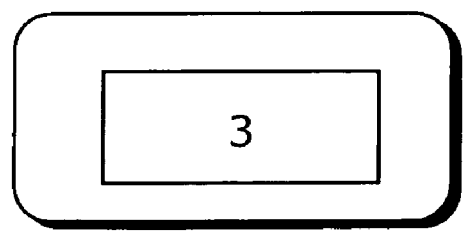
FIG. 17 shows an example of information stored by the primary storage unit according to the present invention.
Figure 17B:
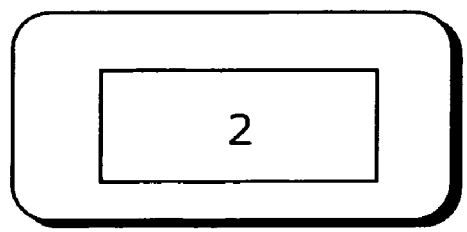
Figure 17C:
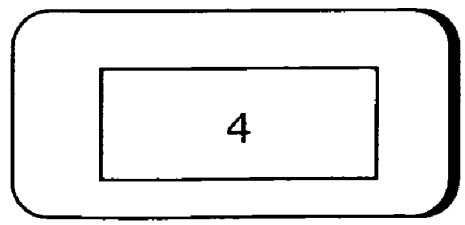

Moreover, when the user presses down the up-cursor 1101 and the down-cursor 1102 on the front panel 1100 while the reproduction is taking place, the reproduction unit 1202*b* receives a notification about such press by the user from the input unit 513 via 15 the CPU 514, and switches the channel being reproduced to another one. First, the reproduction unit 1202b stores, in the primary storage unit 511, the identifier of the channel that is currently reproduced. FIGS. 17A, B and C show example identifiers of channels stored in the primary storage unit 511. FIG. 17A shows that an identifier "3" is stored, and it is shown by referring to FIG. 16 that a channel with the channel name "TV 3" is being reproduced. When the user presses down the up-cursor 1101 in a state illustrated in FIG. 17A, the reproduction unit 1202b refers to the channel information shown in FIG. 16, and passes the identifier "2" of a channel with the channel name of "Channel 2" to the service manager in order to newly reproduce a channel with the channel name of "Channel 2", which is the previous channel in the table. At the same time, the reproduction unit 1202b rewrites the identifier into the channel identifier "2" stored in the primary storage unit 511. FIG. 17B shows such rewritten channel identifier. Meanwhile, when the user presses down the down-cursor 1102 in the state illustrated in FIG. 17A, the reproduction unit 1202b refers to the channel information shown in FIG. 16, and passes the identifier "4" of a channel with the channel name of "TV Japan" to the service manager in order to newly reproduce a channel with the channel name of "TV Japan", which is the next channel in the table. At the same time, the reproduction unit 1202b rewrites the identifier into the channel identifier "4" stored in the primary storage unit 511. FIG. 17c shows such rewritten channel identifier.

The recording unit 1202c stores the received channel identifier, the start time and end time, into the secondary storage unit 510, as management information regarding recording data. The management information regarding recording data is stored, for example, in table form. FIGS. 18A and 18B are examples of management tables stored in the secondary storage unit 510. A column 1701 describes the recording data identifier (recording number) of recording data. A column 1702 describes channel identifiers. These channel identifiers correspond to the channel identifiers in column 1501 in FIG. 16. A column 1703 defines the start time for recording, and indicates the year, month, day, and time for the start of the recording. A column 1704 defines the end time for the recording, and indicates the year, month, day, and time for the end of the recording. A column 1705 defines values which indicate the recording status. In the present embodiment, a value of "0" is carried for pre-recording, "1" for currently-recording, and "2" for recording ended. A column 1706 describes values which indicate whether or not a program to be recorded is a scrambled broadcast. In the present embodiment, a value of "1" is carried in the case of a scrambled broadcast, and "2" for a non-scrambled broadcast. The recording unit 1202c obtains information on whether or not a program to be recorded is a scrambled broadcast via the library 1201b. A column 1707 describes values indicating whether or not a descrambling-not-possible situation was present during the recording of the scrambled broadcast. In the present embodiment, "1" is carried when present, and "2" when not present. Each of lines 1708 and 1709 describes management data regarding respective recording data, and indicates the set of the recording data identifier, channel identifier, recording start time, recording end time, execution status, the value indicating whether or not a program is scrambled or not scrambled, and the value indicating whether or not a descrambling-not-possible situation has occurred.

Furthermore, when the current time reaches the start time in the recording data, the recording unit 1202c rewrites, to "1", the execution status of the management information corresponding to such recording data in the management table, and passes on the recording data identifier and the record instruction to the service manager 1204. For example, referring to FIG. 18A, in the case where the current time is 2004/3/10 11:00, the execution status in line 1709 is rewritten from "0" to "1" as the recording start time in line 1709 has been reached. FIG. 18B shows the recording data after rewriting. The execution status in line 1709 is rewritten as 1. Next, the recording unit 1202c passes on, to the service manager 1204, the recording data identifier and the record instruction of line 1709 which is recording data with a recording start time that has been reached.

The Java VM 1203 is a Java virtual machine that sequentially analyzes and executes programs written in the Java (™) language. Programs written in the Java language are compiled into intermediate codes known as byte codes which do not depend on hardware. The Java virtual machine is an interpreter that executes such byte codes. Some of the Java virtual machines translate the byte codes into an executable form which can be interpreted by the CPU 514 and pass the resultant to the CPU 514, which executes it. The Java VM 1203 gets activated, with a Java program to be executed being specified by the kernel 1201a. In the present embodiment, the kernel 1201a specifies the service manager 1204 as a Java program to be executed. A detailed commentary on the Java language is given in many books that include "Java Language Specification" (ISBN 0-201-63451-1). Therefore, a detailed description about it is omitted here. Also, a detailed commentary on the operation of the Java VM itself is given in many books that include "Java Virtual Machine Specification" (ISBN 0-201-63451-X). Therefore, a detailed description about it is omitted here.

The service manager 1204, which is a Java program written in the Java language, is executed by the Java VM 1203 sequentially. It is possible for the service manager 1204 to call and to be called by another subprogram not written in the Java language through the JNI (Java Native Interface). A commentary on the JNI is given in many books that include "Java Native Interface". Therefore, a detailed description about it is omitted here.

The service manager 1204 accepts the identifier of the channel from the reproduction unit 1202b through the JNI.

Upon accepting the identifier of the channel and the reproduce instruction from the reproduction unit 1202b, the service manager 1204 passes the identifier of the channel to a Tuner 1205c in the Java library 1205 so as to request for tuning. The Tuner 1205c refers to the channel information stored in the secondary storage unit 510 to obtain the tuning information. Assuming that the service manager 1204 passes the identifier "2" of the channel to the Tuner 1205c, the Tuner 1205c refers to the column 1512 shown in FIG. 16, and obtains the tuning information "156 MHz," corresponding to the channel. The Tuner 1205c passes the tuning information to the QAM demodulation unit 501 via the library 1201b of the OS 1201. The QAM demodulation unit 501 demodulates the signal sent from the head end 101 according to the tuning information given to the QAM demodulation unit 501. The resulting signal is passed by the QAM demodulation unit 501 to the POD 504 when the demodulated channel is a scrambled broadcast, and to the TS decoder 505 when it is not a scrambled program. Next, the service manager 1204 requests a CA 1205b inside the Java library 1205 to perform descrambling. The CA 1205d provides the POD 504 with information required for descrambling through the library 1201b in the OS 1201. On the basis of such provided information, the POD 504 descrambles the signal provided by the QAM demodulation unit 501, and passes the resulting signal to the TS decoder 505.

Next, the service manager 1204 provides a JMF 1205*a* inside the Java library 1205 with the identifier of the channel, so as to request for the reproduction of the video and audio.

Figure 19:
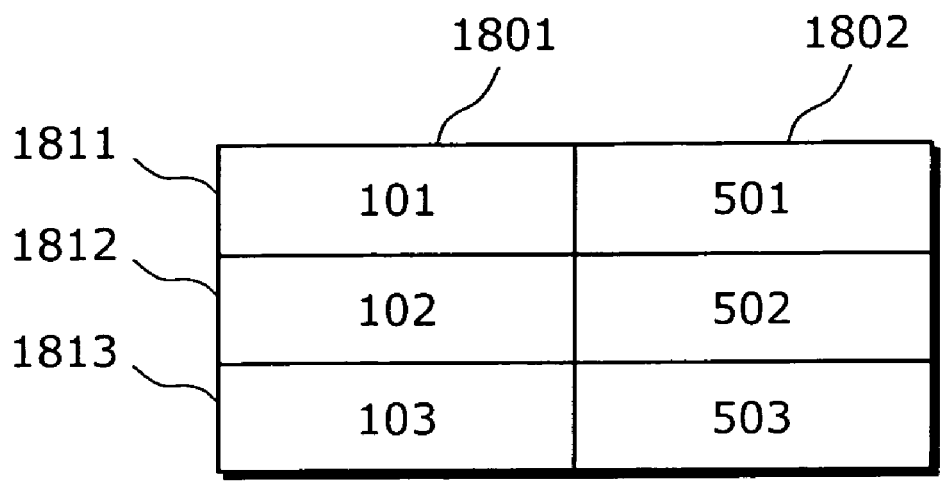
FIG. 19 is a schematic diagram representing the details of the PAT defined by the MPEG-2 Specification, according to the present invention.
Figure 20:
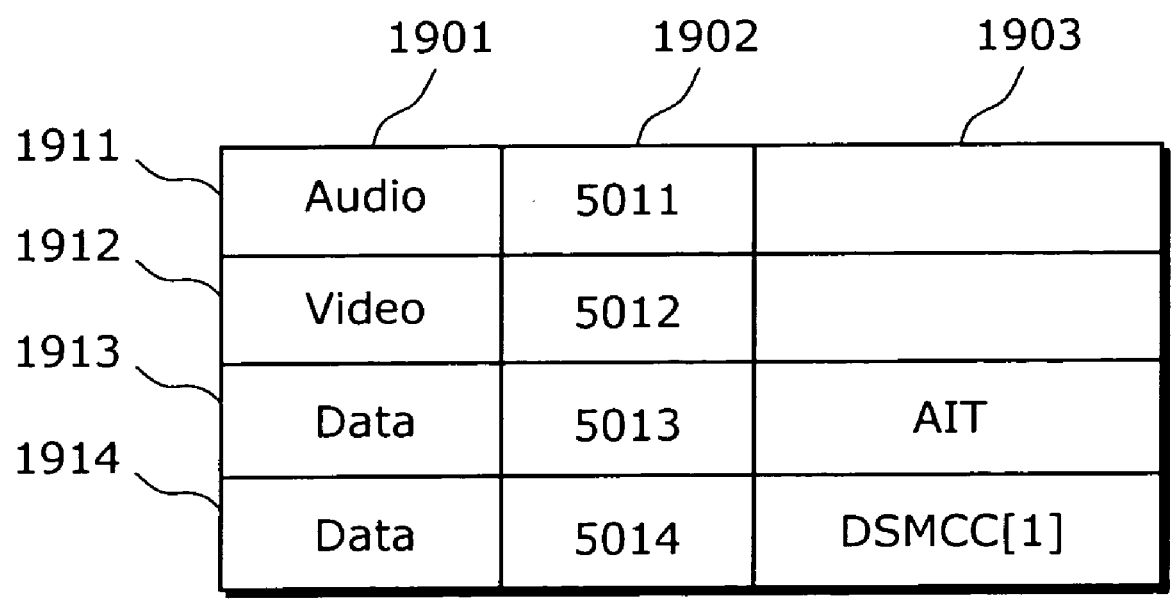
FIG. 20 is a schematic diagram representing the details of the PMT defined by the MPEG-2 Specification, according to the present invention.

First, the JMF 1205*a* obtains, from a PAT and a PMT, packet IDs used to specify the video and audio to be reproduced. PAT and PMT are tables defined by the MPEG-2 standard that show the program line-up included in an MPEG-2 transport stream. PAT and PMT are carried in the payloads in packets included in an MPEG-2 transport stream, together with audio and video. Refer to the specification for a detailed description of PAT and PMT. Here, only an overview of PAT and PMT is given. PAT, which is an abbreviation of Program Association Table, is carried in packets with the packet ID "0". In order to obtain the PAT, the JMF 1205*a* indicates, to the TS decoder 505, the packet ID "0" and the CPU 514 through the library 1201*b* of the OS 1201. Then, the TS decoder 505 performs filtering based on the packet ID "0", and passes the resultant to the CPU 514. Accordingly, the JMF 1205*a* can collect the PAT packets. FIG. 19 illustrates a table that schematically shows an example of the collected PAT information. A column 1801 describes program numbers. A column 1802 describes packet IDs. The packet IDs shown in the column 1802 are used to obtain the PAT. Each of lines 1811~1813 is a pair of the program number of a channel and a packet ID corresponding to it. Here, three channels are defined. The line 1811 defines a pair of the program number "101" and the packet ID "501". Assuming that the channel identifier provided to the JMF 1205*a* is "2", the JMF 1205*a* refers to the column 1512 in FIG. 16, so as to obtain the program number "102" corresponding to such channel identifier, and then refers to the column 1812 in the PAT shown in FIG. 19, so as to obtain the packet ID "502" corresponding to the program number "102". PMT, which is an abbreviation of Program Map Table, is carried in packets with the packet IDs specified in the PAT. In order to obtain the PMT, the JMF 1205*a* indicates, to the TS decoder 505, a packet ID and the CPU 514 through the library 1201*b* of the OS 1201. Here, a packet ID to be specified is "502". Then, the TS decoder 505 performs filtering based on the packet ID "502", and passes the resultant to the CPU 514. Accordingly, the JMF 1205*a* can collect the PMT packets. FIG. 20 illustrates a table that schematically shows an example of the collected PMT information. A column 1901 describes stream types. A column 1902 describes packet IDs. Information specified in the respective stream types is carried in the payloads of packets with the packet IDs specified in the column 1902. A column 1903 describes additional information. Each of columns 1911~1914 is a pair of a packet ID and the type of information being transmitted, which is known as an elementary stream. The column 1911, which is a pair of the stream type "audio" and the packet ID "5011", indicates that audio data is stored in the payload of the packet with the packet ID "5011". The JMF 1205*a* obtains, from the PMT, the packet IDs of the video and audio to be reproduced. Referring to FIG. 20, the JMF 1205*a* obtains the audio packet ID "5011" from the line 1911, and the video packet ID "5012" from the line 1912.

Then, the JMF 1205*a* provides the TS decoder 505 with pairs of the obtained audio packet ID and the audio decoder 506 as an output destination as well as the video packet ID and the video decoder 508 as an output destination, via the library 1201*b* of the OS 1201. The TS decoder 505 performs filtering based on such provided packet IDs and the output destinations. Here, the packet with the packet ID "5011" is passed to the audio decoder 506 and the packet with the packet ID "5012" is passed to the video decoder 508. The audio decoder 506 performs digital-to-analog conversion on the provided packet, and outputs the result to the audio output unit 507. The video decoder 508 performs digital-to-analog conversion on the provided packet, and outputs the video to the video output unit 509.

Finally, the service manager 1204 provides the channel identifier to an AM 1205*b* in the Java library 1205, so as to request for data broadcast reproduction. Here, data broadcast reproduction means to extract a Java program included in the MPEG-2 transport stream and cause the Java VM 1203 to execute it. As a technique for embedding a Java program into an MPEG-2 transport stream, a method known as DSMCC, which is described in the MPEG specification ISO/IEC138181-6, is used. A detailed explanation of DSMCC is omitted here. DSMCC specification defines a method of encoding a file system comprised of directories and files used by a computer, in packets within an MPEG-2 transport stream. Information about the Java program to be executed is carried in packets in the MPEG-2 transport stream in the form of AIT. AIT is an abbreviation of Application Information Table whose definition is given in the tenth chapter of the DVB-MHP standard (formally known as ETSI TS 101 812 DVB-MHP specification V1.0.2).

Furthermore, upon accepting the identifier of the recording data and the record instruction from the recording unit 1202*c*, the service manager 1204 searches for a recording identifier that matches the accepted recording identifier from column 1701 of the recording data stored in the secondary storage unit 510, and passes the channel identifier in the same line to the Tuner 1205*c* in the Java library 1205 so as to request for tuning. The Tuner 1205*c* refers to the channel information stored in the secondary storage unit 510 to obtain the tuning information. Now, assuming that the recording unit 1202*c* passes the recording data identifier "2" and the record instruction to the service manager 1204, the service manager searches for "2" from column 1701 in FIG. 18B and identifies the line 1709 having the recording identifier "2". Next, assuming that the service manager 1204 passes the channel identifier "2" of the recording data line 1709 to the Tuner 1205*c*, the Tuner 1205*c* refers to the column 1512 shown in FIG. 16, and obtains the corresponding tuning information "156 MHz". The Tuner 1205*c* passes the tuning information to the QAM demodulation unit 501 via the library 1201*b* of the OS 1201. The QAM demodulation unit 501 demodulates the signal sent from the head end 101 according to the tuning information given to the QAM demodulation unit 501. The resulting signal is passed by the QAM demodulation unit 501 to the POD 504 when the demodulated channel is a scrambled broadcast, and to the TS decoder when it is not a scrambled program. Next, the service manager 1204 requests the CA 1205*b* inside the Java library 1205 to perform descrambling. The CA 1205*d* provides the POD 504 with information required for descrambling through the library 1201*b* in the OS 1201. On the basis of such provided information, the POD 504 descrambles the signal provided by the QAM demodulation unit 501, and passes the resulting signal to the TS decoder 505 and the secondary storage unit 510. Next, the service manager 1204 requests a REC 1205*e* inside the Java library 1205 to record. The REC 1205*e* provides a record instruction to the secondary storage unit 510 through the library 1201*b* in the OS 1201. The secondary storage unit stores the data outputted by the POD 504. Here, the data stored by the secondary storage unit 510 may also be data outputted by the TS decoder 505.

Although description is made with the secondary storage unit 510 being exemplified as a storage medium such as a hard disk existing inside a terminal apparatus, it is also possible to have the secondary storage unit 510 existing outside the terminal apparatus 500, and connected via wiring and the like.

Furthermore, the secondary storage unit 510 need not be limited to a hard disk, and may also be an optical disc which can be detached from an optical disc apparatus, as well as media such as a card media.

First, in order to obtain the AIT, the AM 1205*b* obtains the PAT and PMT as in the case of the JMF 1205*a*, so as to obtain the packet ID of the packet that stores the AIT. Assuming that "2" is the provided channel identifier and that the PAT shown in FIG. 19 and the PMT shown in FIG. 20 are being transmitted, the AM 1205*b* obtains the PMT shown in FIG. 20 according to the same procedure followed by the JMF 1205*a*. Subsequently, the AM 1205*b* extracts, from the PMT, the packet ID of the elementary stream whose stream type is "Data" and which has "AIT" as additional information. As shown in FIG. 20, the elementary stream in the line 1913 corresponds to such elementary stream, and therefore the AM 1205*b* obtains the packet ID "5013" from it.

Figures 21, 22:
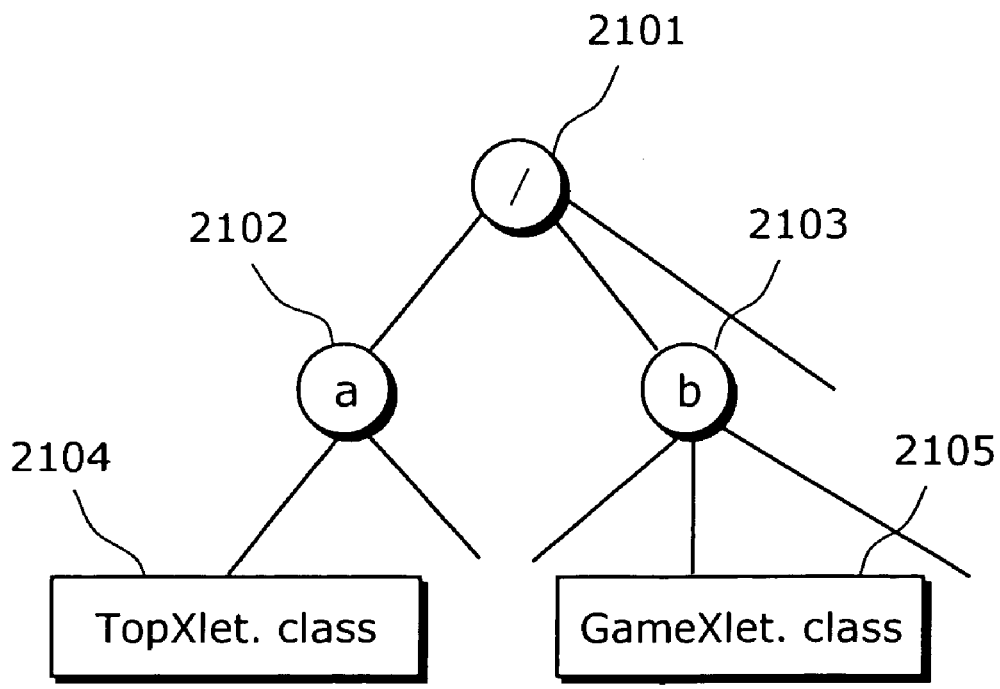
FIG. 21 is a schematic diagram representing the details of the AIT defined by the OCAP Specification, according to the present invention.
FIG. 22 is a diagram showing an example of a downloaded file system, in the first embodiment.

The AM 1205*b* provides the TS decoder 505 with the packet ID of the AIT and the CPU 514 as an output destination through the library 1201*b* of the OS 1201. Then, the TS decoder 505 performs filtering based on such provided packet ID, and passes the resultant to the CPU 514. Accordingly, the AM 1205*b* can collect the packets of AIT. FIG. 21 is a table that schematically shows an example of the collected AIT information. A column 2001 describes identifiers of Java programs. A column 2002 describes control information for controlling the Java programs. The control information includes "autostart", "present", and "kill". "autostart" means that the terminal apparatus 500 automatically executes the program promptly. "present" means that the program is not executed automatically. "kill" means that the program is to be terminated. A column 2003 describes DSMCC identifiers used to extract packet IDs that include Java programs in the DSMCC format. A column 2004 describes program names of the Java programs. Each of columns 2011 and 2012 is a set of information about a Java program. The Java program defined in the column 2011 is a set of an identifier "301", control information "autostart", a DSMCC identifier "1", and a program name "a/TopXlet". The Java program defined in the column 2012 is a set of an identifier "302", control information "present", a DSMCC identifier "1", and a program name "b/GameXlet". Here, these two Java programs have the same DSMCC identifier. This indicates that two Java programs are included in the file system which has been encoded according to the same DSMCC method. Here, only four items of information are specified for the respective Java programs, but more items of information are specified in actuality. Refer to the DVB-MHP specification for detail.

The AM 1205*b* finds the "autostart" Java program from the AIT, and extracts the corresponding DSMCC identifier and Java program name. Referring to FIG. 21, the AM 1205*b* extracts the Java program in the line 2011, and obtains the DSMCC identifier "1" and the Java program name "a/TopXlet".

Next, the AM 1205*b* obtains, from the PMT, the packet ID of packets that store Java programs in the DSMCC format, using the DSMCC identifier obtained from the AIT. More specifically, the AM 1205*b* obtains, from the PMT, the packet ID included in the elementary stream whose stream type is "Data" and whose DSMCC identifier in the additional information matches.

Here, assuming that such DSMCC identifier is "1" and the PMT is the one shown in FIG. 20, the elementary stream in the line 1914 satisfies the above condition. Therefore, the packet ID "5014" is to be extracted.

The AM 1205*b* indicates, to the TS decoder 505, the packet ID of packets in which data is embedded in the DSMCC format as well as the CPU 514 as an output destination through the library 1201*b* of the OS 1201. Here, the packet ID "5014" is provided. Then, the TS decoder 505 performs filtering based on the provided packet ID, and passes the resultant to the CPU 514. Accordingly, the AM 1205*b* can collect the required packets. The AM 1205*b* reconstructs the file system from the collected packets according to the DSMCC method, and stores the reconstructed file system into the primary storage unit 511. The process for extracting data such as the file system from packets in the MPEG-2 transport and storing the extracted data into storage units such as the primary storage unit 511 is hereinafter called download.

FIG. 22 shows an example of the downloaded file system. In the diagram, circles represent directories and squares represent files, where 2101 is a root directory, 2102 is a directory "a", 2103 is a directory "b", 2104 is a file "TopXlet.class", and 2105 is a file "GameXlet.class".

Subsequently, the AM 1205*b* passes, to the Java VM 1203, a Java program to be executed out of the file system downloaded into the primary storage unit 511. Here, assuming that the Java program name to be executed is "a/TopXlet", a file "a/TopXlet.class", resulting from the appendage of ".class" to the above Java program name, is a file to be executed. "/" is a delimiter between a directory and a file name, and as shown in FIG. 22, the file 2104 is a Java program to be executed. Next, the AM 1205*b* passes the file 2104 to the Java VM 1203.

The Java VM 1203 executes such received Java program.

Upon the receipt of the identifier of another channel and reproduce instruction, the service manager 1204 terminates the reproduction of the video and audio as well as the execution of the Java program which are being carried out through each library included in the Java library 1205, through each library included in the same Java library 1205, and then performs the reproduction of the video and audio as well as the execution of a Java program based on the newly received channel identifier. Furthermore, upon receiving the identifier of another channel and a record instruction, the service manager 1204 does not perform the execution of the Java program. In the case of recording, as the execution of the Java program is not carried out, the amount of use for the CPU 514 and the primary storage unit 511 can be reduced. In addition, the service manager 1204 performs control so that during the recording of a scrambled video, the POD 603 is not ejected even when the POD eject button 1109 is pressed. At this time, before the ejection of the POD 603 is actually executed, a message which indicates that a descrambled video is currently being recorded may also be notified to the user.

The Java library 1205 is a collection of plural Java libraries stored in the ROM 512. In the present embodiment, the Java library 1205 includes the JMF 1205*a*, the AM 1205*b*, the Tuner 1205*c*, the CA 1205*d*, the REC 1205*e*, and a POD Lib 1205*f*, and so on.

The REC 1205*e* has a function for performing recording using the library 1201*b*. The REC 1205*e* receives, as an input, a record instruction as well as a terminate-recording instruction from the service manager 1204. In the case where a record instruction is inputted, the REC 1205*e* outputs the record instruction to the library 1201*b*. In the case where terminate-recording instruction is inputted, the REC 1205*e* outputs the terminate-recording instruction to the library 1201*b*.

Next, the recording automatic-termination function which is an important function of the present embodiment is described.

The service manager 1204 accepts the recording data identifier and the record instruction from the recording unit 1202*c*, and can store the program in the secondary storage unit 510, through the REC 1205e included in the Java library 1205.

The recording automatic-termination function, which is an important function of the present embodiment, automatically terminates the recording performed by the service manager 1204 in the case where a descrambling-not-possible situation occurs while recording is being executed.

Figure 23:
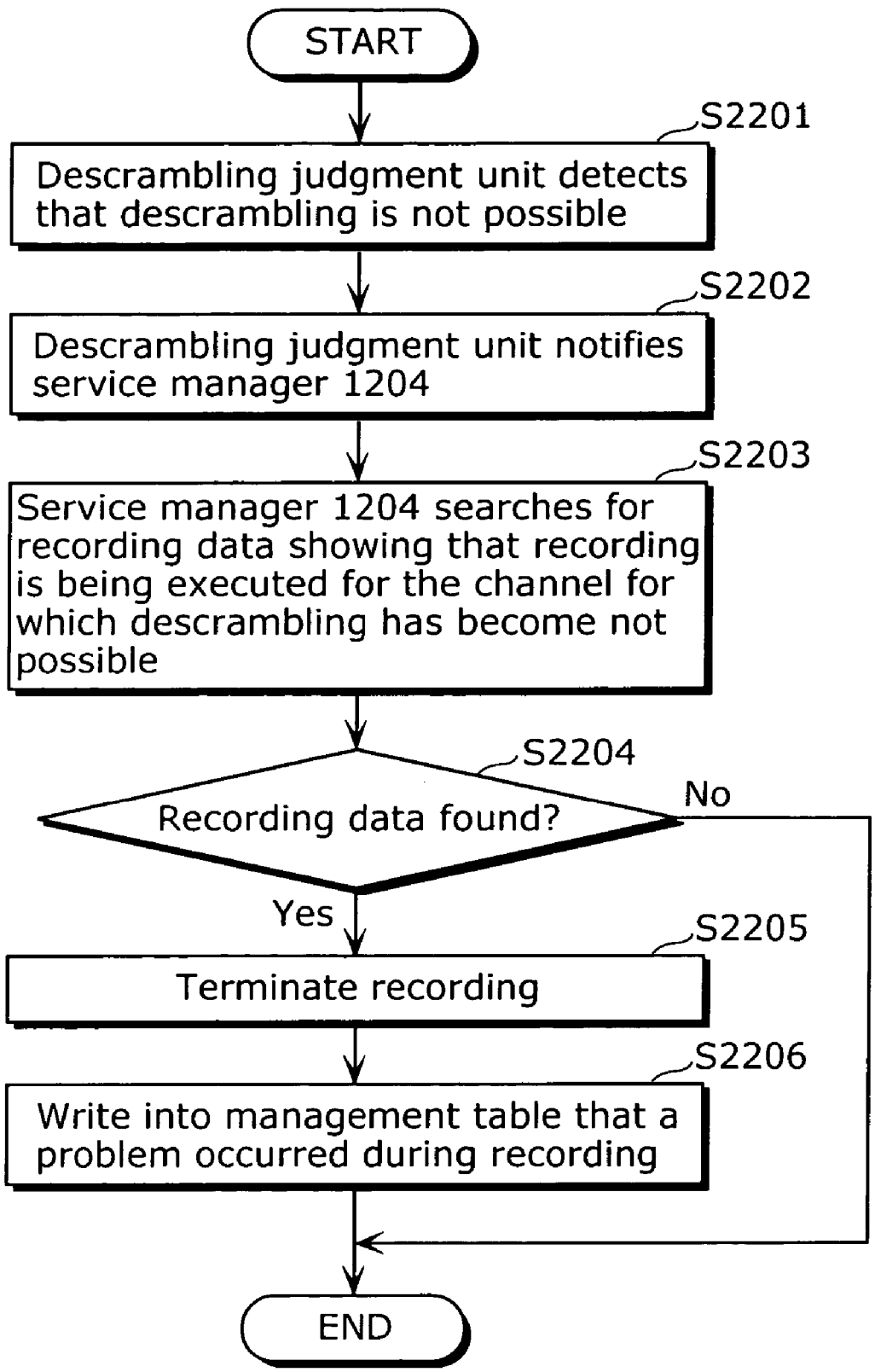
FIG. 23 is a flowchart indicating the operation when a descrambling-not-possible situation occurs during recording, in the first embodiment.

FIG. 23 is a flowchart for the case where a descrambling-not-possible situation occurs during recording.

First, the descrambling judgment unit 515 detects the channel where the descrambling-not-possible situation has occurred (Step 2201). This is performed by detecting, at the terminal apparatus 500-side, the state of attachment/detachment of the POD 504 (for example: by detecting the pressing of an input button for detaching the POD 54; and by carrying out an exchange of signals between the POD 504 and the terminal apparatus 500 at fixed times, where the terminal apparatus detects when the signal from the POD 504 does not come at the fixed time), and by receiving a descrambling-not-possible message from the CPU 706 of the POD 504. Moreover, the POD 504 notifies the descrambling judgment unit 515 that descrambling has become not possible: when a key, per se, cannot be obtained; when an obtained key is different from the required key; when the key is invalid; when in the case where the POD 504 can descramble a plurality of scrambled data, the scrambled data to be recorded cannot be descrambled; and so on.

Next, the descrambling judgment unit 515 passes, to the service manager 1204, the channel identifier for which descrambling has become not possible (Step 2202).

Next, the service manager 1204 searches the management table stored in the secondary storage unit 510, for management information regarding the recording data showing that recording is being executed on the channel indicated by the channel identifier passed on from the descrambling judgment unit 515 and which is in the descrambling-not-possible situation (Step 2203). To be more specific, a search is performed for the line having a channel identifier in column 1702 in FIG. 18B which matches the received channel identifier and at the same time having a value of "1" for the column 1705 which indicates the execution status of recording. Here, assuming that the service manager 1204 receives, from the descrambling judgment unit 515, a message stating the descrambling-not-possible situation for channel identifier "2", line 1709 in the management table shown in FIG. 18B becomes the corresponding recording data.

Next, in the case where the recording data showing that recording is being executed on the channel for which descrambling has become not possible is found (Yes in Step 2204), the service manager 1204 outputs the terminate-recording instruction to the REC 1205e included in the Java library 1205. Upon receiving the inputted terminate-recording instruction, REC 1205e outputs the terminate-recording instruction to the library 1201b to have the recording terminated (Step 2205). In the case where none is found (No in Step 2204), nothing is done. Furthermore, it is possible to judge whether or not to terminate the recording by referring to a setting file which is set in advance by the user.

Next, the service manager 1204 writes into the management table stored in the secondary storage unit 510, the fact that a descrambling-not-possible situation has occurred during recording (Step 2206). To be more specific, the value in column 1707 in the management table shown in FIG. 18B is rewritten from "0" to "1".

Moreover, although in the present embodiment, the EPG 1202, the service manager 1204, and the Java library 1205 are described as software written in the Java language, such programs may be written in languages other than Java, such as C language and native language, and may be installed through hardware.

Moreover, in the present embodiment, in the case where recording data showing that recording is being executed on the channel for which descrambling has become not possible is found, the service manager 1204 terminates the recording, through the REC 1205e. However, it is also possible to notify the EPG 1202 (downloaded application) which issued the record request this time. In this manner, the EPG 1202 is able to know that a problem has occurred on the current recording for the record request it has issued, and processing which is different from that for normal recording data can be carried out on the recording data in which a problem has occurred (for example, performing processes such as: deleting the recording data in which a problem has occurred; notifying the user that a problem has occurred; re-setting the timer for timer-recording when the same program is to be re-aired).

The recording automatic-termination function in the present embodiment has thus been described up to this point. According to this function, it becomes possible to terminate unneeded recording in the case where a descrambling-not-possible situation occurs during recording. Therefore, the strain on the available capacity of the secondary storage unit 510 provided in the terminal apparatus and which records and stores recording data, is eliminated.

Second Embodiment

In the first embodiment, recording is terminated in the case where a descrambling-not-possible situation occurs during recording. However, when the descrambling-not-possible situation only lasts a short period and scrambling becomes possible again right away, the period in which a program is recorded in the scrambled state is also short. Therefore, there are also cases where continuing the recording of the program is more advantageous for the user.

As such, in the present embodiment, recording is continued even when a descrambling-not-possible situation occurs during recording. However, in the case of writing the program, recorded in the secondary storage unit 510, into a medium inserted in the media writing unit 516, whether or not writing is to be carried out is confirmed with the user.

Figure 24:
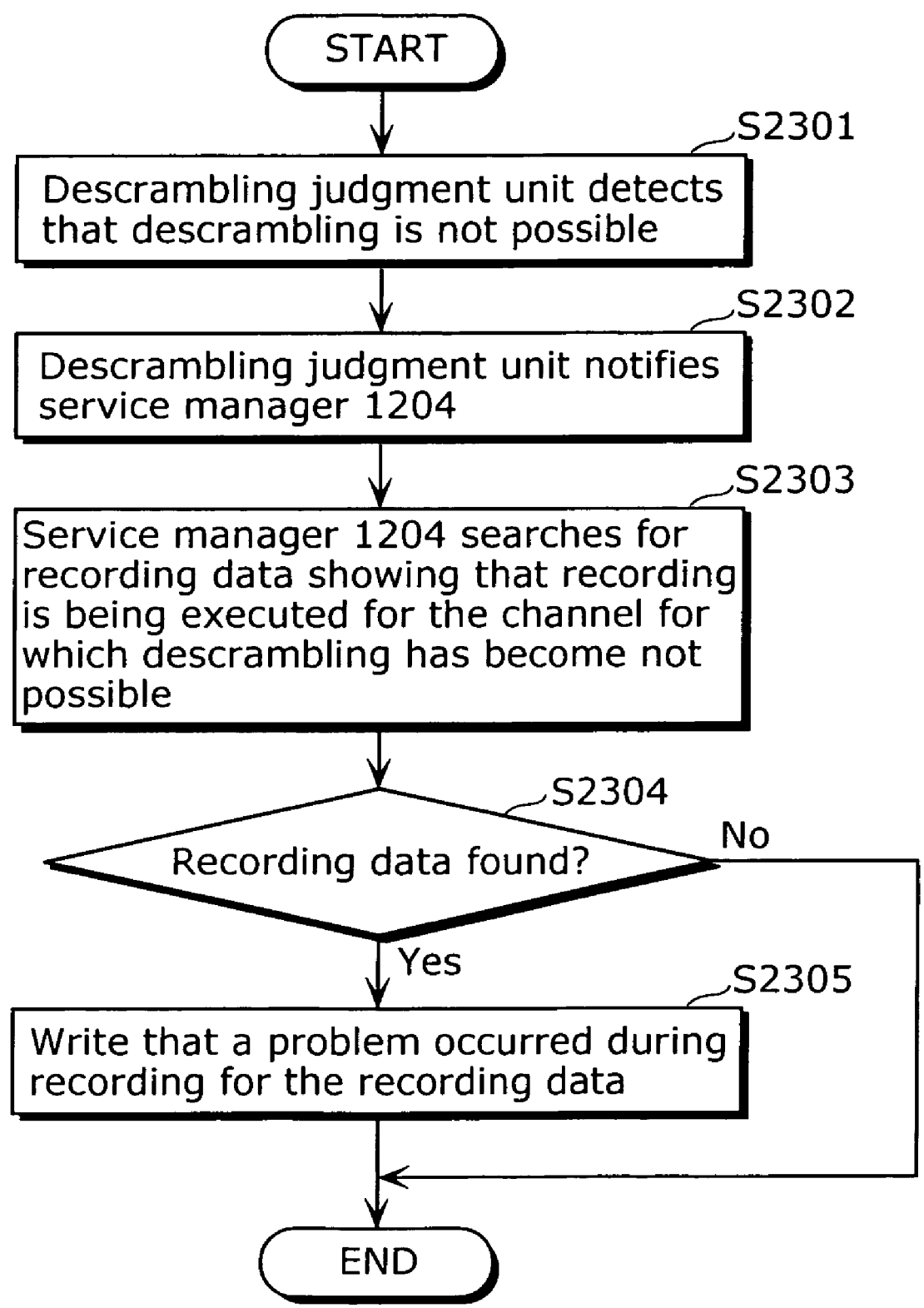
FIG. 24 is a flowchart indicating the operation when a descrambling-not-possible situation occurs during recording, in the second embodiment.

FIG. 24 is a flowchart for the recording function in the present embodiment, in the case where a descrambling-not-possible situation occurs during the recording of a program.

Step 2301 to step 2304 are the same procedures as step 2201 to step 2204 of the flowchart in FIG. 23.

In the case where recording data showing that recording is being executed on the channel for which descrambling has become not possible is found (Yes in Step 2304), the service manager 1204 writes into the management table stored in the secondary storage unit 510 that a descrambling-not-possible situation has occurred during recording (Step 2305). The process details of step 2305 are the same as in step 2206 in FIG. 23.

As described above, in the present embodiment, the recording into the secondary storage unit 510 is continued even when a descrambling-not-possible situation occurs.

Furthermore, the service manager 1204 instructs the media writing unit 516 to write the program stored in the secondary storage unit 510 into the medium inserted in the media writing unit 516. At this time, in the case where there is a period in which a descrambling-not-possible situation has occurred during the recording of the recording-subject-program to be written, it is confirmed with the user whether or not the writing is to be carried out. When the user makes an input stating that writing is not to be carried out, the writing is terminated.

Figure 25:
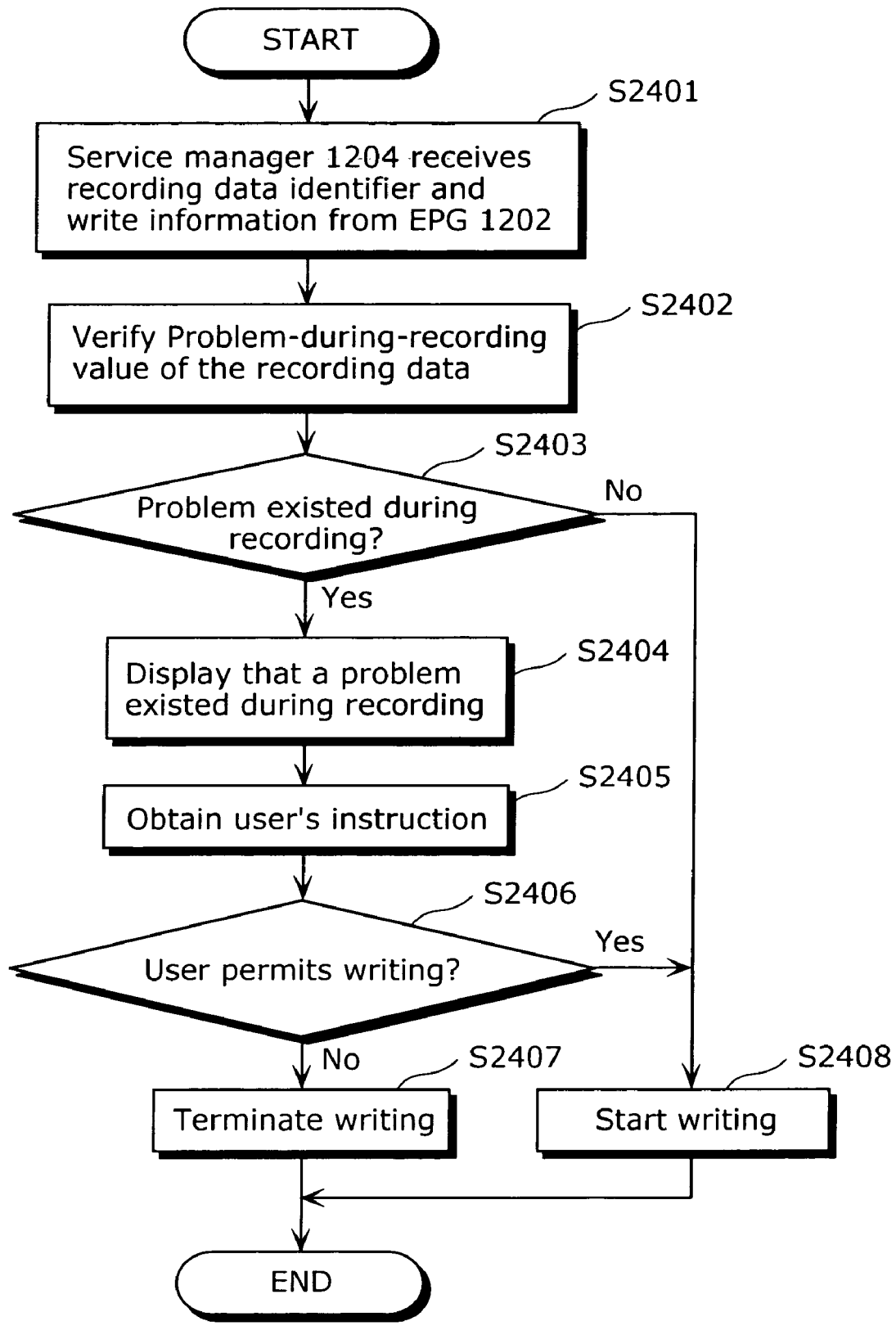
FIG. 25 is a flowchart indicating the operation in writing, onto a writable medium, a program which is the subject of recording.

FIG. 25 is a flowchart for the writing of a recording-subject-program into a medium.

An EPG 1202 displays a list of programs recorded in the secondary storage unit 510, on the display 609 through the video output unit 509. FIG. 26 shows an example of the recording-subject-program list displayed by the EPG. A column 2501 describes the identifier of recording data. A column 2502 describes the name of a recorded program. A column 2503 describes a value which indicates whether or not a descrambling-not-possible situation has occurred during recording. A line 2504 indicates the set of the recording data identifier, the program name, and the value indicating whether or not descrambling became not-possible during recording. By using this display screen, the user can judge whether or not descrambling became not-possible during recording without viewing the details of the recorded program, and the program to be written into the medium can be selected without worry. The EPG receives, through the input unit 513, the recording data identifier of the program selected by the user, and passes the recording data identifier and a write instruction to the service manager 1204. The service manager 1204 receives, through the EPG, the identifier of the recording data to be recorded and the write instruction (Step 2401).

Figure 27:
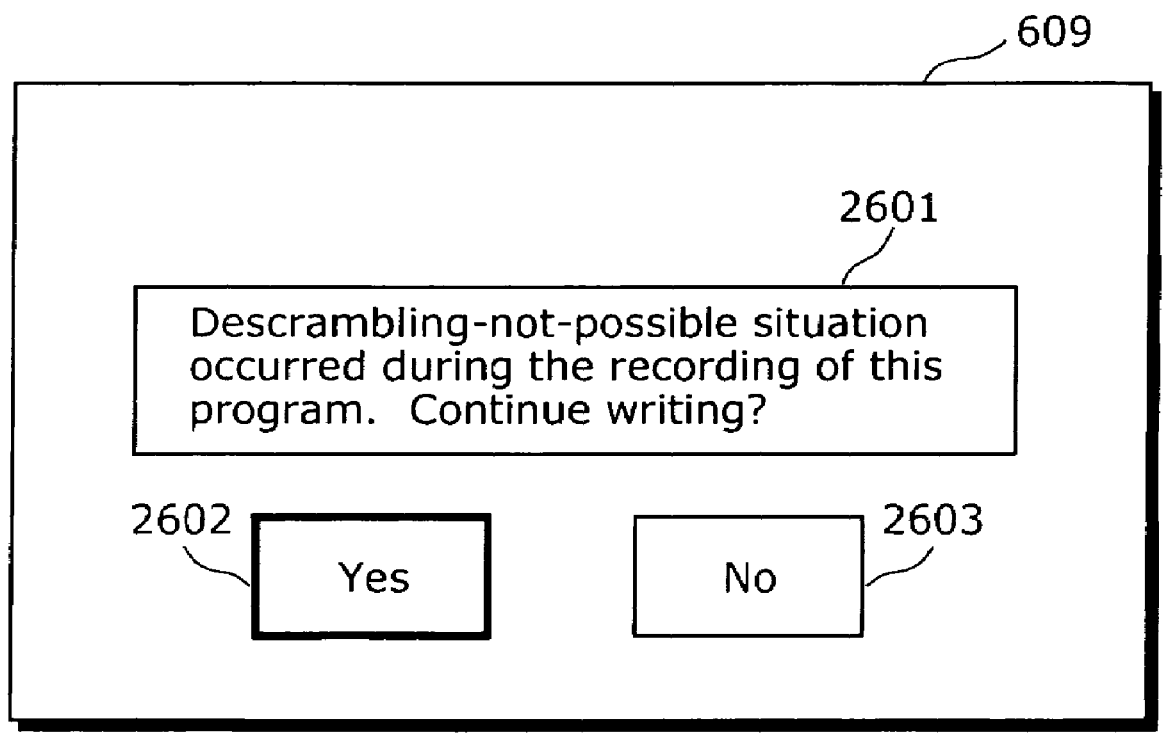
FIG. 27 shows an example of a screen display of the display according to the present invention.

Next, the service manager 1204 verifies whether or not a descrambling-not-possible situation has occurred during the recording of the recording-subject-program to be written (Step 2402). To be more specific, a line with a matching recording identifier is searched from the management table shown in FIG. 18B, and the column 1707 value of the found line is verified. When the value is "1", it is judged that a problem has occurred such as when descrambling becomes not possible during recording. It is judged that the problem has not occurred when the value is "0". In the case where the problem has not occurred (No in Step 2403), a write instruction and the recording data identifier are passed on to the media writing unit 516, and the media writing unit 516 writes, into the media, the recording-subject-program stored in the secondary storage unit 510 (Step 2408). In the case where the problem has occurred (Yes in Step 2403), a message to the user confirming whether or not the writing is to be carried out is outputted to the video output unit 509 (Step 2404). FIG. 27 shows the display screen of the user confirmation outputted to the audio output unit 509. A message 2601 is message stating, to the user, that a descrambling-not-possible situation has occurred during the recording of the program to be written into the media. A Yes-button 2602 is a button which is pressed when continuance of the writing is selected by the user, and a No-button 2603 is a button pressed when the user selects not to continue the writing. Next, the service manager 1204 obtains the instruction of the user (Step 2405), and judges whether or not the user has permitted the writing (Step 2406). In the case where the user has permitted the writing (Yes in Step 2406), in other words, when the user has pressed the Yes-button 2602, the writing onto the medium is carried out (Step 2408). On the other hand, in the case where the user does not permit the writing (No in Step 2406), in other words, when the user has pressed the No-button 2603, the instruction for the media writing unit 516 is not passed, and nothing is done (Step 2407). Furthermore, it is also possible to automatically move the process from step 2402 to step 2405 or step 2406 without executing step 2402 and step 2404.

Moreover, although in the present embodiment, the EPG 1202, the service manager 1204, and the Java library 1205 are described as software written in the Java language, such programs may be written in languages other than Java, such as C language and native language, and may be installed through hardware.

According to the aforementioned function, with regard to a program for which a descrambling-not-possible situation has occurred during program recording, the writing of unneeded recording data into a medium is prevented as it is possible to recognize, before writing into the medium, that there is a problem in the recording data due to the occurrence of a descrambling-not-possible situation.

Figure 29:
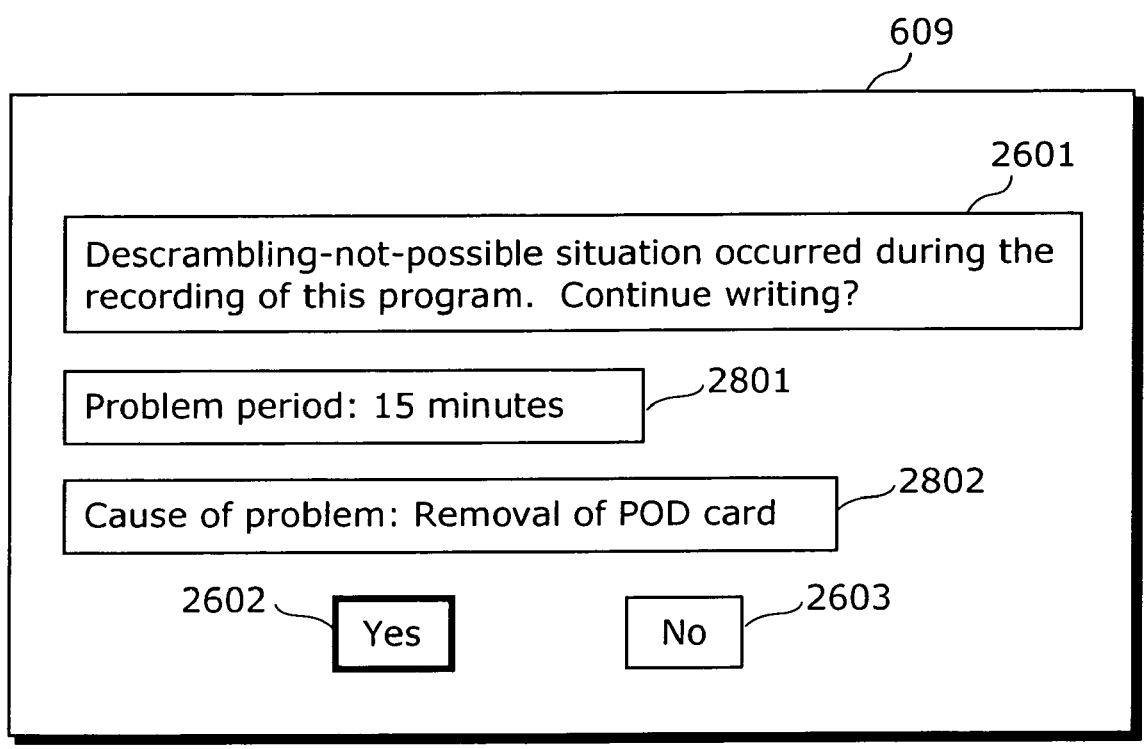
FIG. 29 shows an example of a screen display of the display according to the present invention.

Furthermore, although in the present embodiment, only the occurrence of a problem during recording is notified to the user, the present invention is not limited to this. For example, the time period for which descrambling was not possible can be measured, and in addition to the occurrence of the descrambling-not-possible situation, the time period for which descrambling was not possible may also be notified. In this case, as shown in FIG. 28, the service manage 1204 writes the measured time period into the management table stored in the secondary storage unit 510, as a problem period 2701. Subsequently, when the writing into a medium is requested, a duration 2801 for which descrambling was not possible, as shown in FIG. 29, is displayed, and the occurrence of a problem during recording is notified to the user. Accordingly, the user is able to know the duration for which the problem has occurred during recording, and can refer to such duration in deciding whether or not to continue with the writing into the medium. In addition, the cause for the occurrence of the problem may also be notified to the user. In this case, the descrambling judgment unit 515 judges whether or not the terminal apparatus 500 physically detects that the POD 504 has been detached, or whether or not the fact that a key required for descrambling can no longer be acquired, is received from the POD 504. Furthermore, the service manager 1204 writes the result of the judgment by the descrambling judgment unit 515 into the management table as a problem occurrence cause 2702, as shown in FIG. 28. When the writing into the medium is requested, the cause 2802 for the descrambling becoming not possible is displayed as shown in FIG. 29, and the occurrence of the problem during recording is notified to the user. Accordingly, the user is able to know the cause for the occurrence of the problem during recording.

In addition an interface (not shown) can be provided in the display screen in FIG. 29, for accepting a request to display the recording data for the period before and after the occurrence of the problem. For example, by using the information of the problem period 2701 and displaying the recording data before and after the occurrence of the descrambling-not-possible situation when the input from such interface is received, it is possible to swiftly decide whether or not the recording data during the period for which descrambling was not possible is needed by the user. Therefore, the decision, by the user, as to whether or not to write into a recording medium can be carried out appropriately and swiftly.

Furthermore, when recording is currently being executed for the channel in which descrambling has become not possible, the recording for such channel is terminated in the aforementioned first embodiment, while the recording for such channel is continued in the above-mentioned second embodiment. However, the invention is not limited to such. For example, the duration for which descrambling was not possible can be measured and when descrambling becomes possible again, whether or not to resume the recording may be decided depending on the duration for which descrambling was not possible. In this case, as shown in FIG. 30A, when the duration for which descrambling was not possible (NG) is short and below a predetermined threshold, recording is resumed when descrambling becomes possible again. Furthermore, as shown in FIG. 30B, when the duration for which descrambling was not possible (NG) is long and equals or exceeds the predetermined threshold, recording is not resumed even when descrambling becomes possible again. With this, it is possible to control recording depending on the duration for which descrambling is not possible.

Moreover, in the aforementioned example, the EPG 1202 searches for management information corresponding to the requested recording-subject-program, refers to the recording start time 1703, recording end time 1704, and the problem period 2701 in the found management information, and creates the problem information found in FIG. 26. However, it is also possible that: the EPG 1202 requests the service manager 1204 to search for the management information corresponding to the requested recording-subject-program; the service manager 1204 performs the search according to the received request, using the necessary mathematical functions (or function, as in feature), and returns the search result (the recording start time 1703, recording end time 1704, and the problem period 2701 in the management information) to the EPG 1202; the EPG 1202 creates the problem information using the search result; and the display 609 displays the problem information.

Third Embodiment

In the aforementioned second embodiment, when recording data having a problem is written onto the recording medium, problem information is notified to the user. In the present embodiment, when recording data having a problem is reproduced, problem information is notified to the user. In this example, a terminal apparatus (digital broadcast recording apparatus) includes a reproduction unit (not shown in the diagrams) which reproduces a recording-subject-program stored in the secondary storage unit.

FIG. 31 is a diagram showing an example of the problem information which is notified to the user according to the present embodiment.

In FIG. 31, 609 represents the display 609 shown in FIG. 7. A display 1710 describes problem information created based on, for example, the management information corresponding to line 1708 indicated in FIG. 28. Here, description is carried out with "Cinema A" being the recording-subject-program corresponding to line 1708, as an example. Time 2701a indicates the time at which the problem included in the recorded program occurred. Time 2701b indicates the time at which the problem included in the recorded program ended. Segment 2703a indicates the segment throughout which the problem included in the recorded program occurred. Segment 2703b indicates a segment included in the recorded program, which was recorded normally. A display 1711 indicates the percentage occupied by the segment which was recorded normally, within the recording-subject-program. The length of segment 2703a changes depending on the length of time for the problem period 2701 indicated in FIG. 28. The position of segment 2703a changes depending on the start time and end time of the problem period 2701 shown in FIG. 28.

The process for displaying the problem information shown in FIG. 31 is described.

When there is a request, from the user, to reproduce a recording-subject-program, the EPG 1202 searches for management information corresponding to the recording-subject-program that has been requested. Next, the EPG 1202 refers to the recording start time 1703, the recording end time 1704, and the problem period 2701 of the management information obtained from the search, creates the problem information shown in FIG. 31, and shows this on the display 609.

Moreover, in the aforementioned example, the EPG 1202 searches for management information corresponding to the requested recording-subject-program, refers to the recording start time 1703, recording end time 1704 and the problem period 2701 in the found management information, and creates the problem information found in FIG. 31. However, it is also possible that: the EPG 1202 requests the service manager 1204 to search for the management information corresponding to the requested recording-subject-program; the service manager 1204 performs the search according to the received request, using the necessary mathematical functions (or function, as in feature), and returns the search result (the recording start time 1703, recording end time 1704 and the problem period 2701 in the management information) to the EPG 1202; the EPG 1202 creates the problem information using the search result; and the display 609 displays the problem information.

Fourth Embodiment

Figure 32:
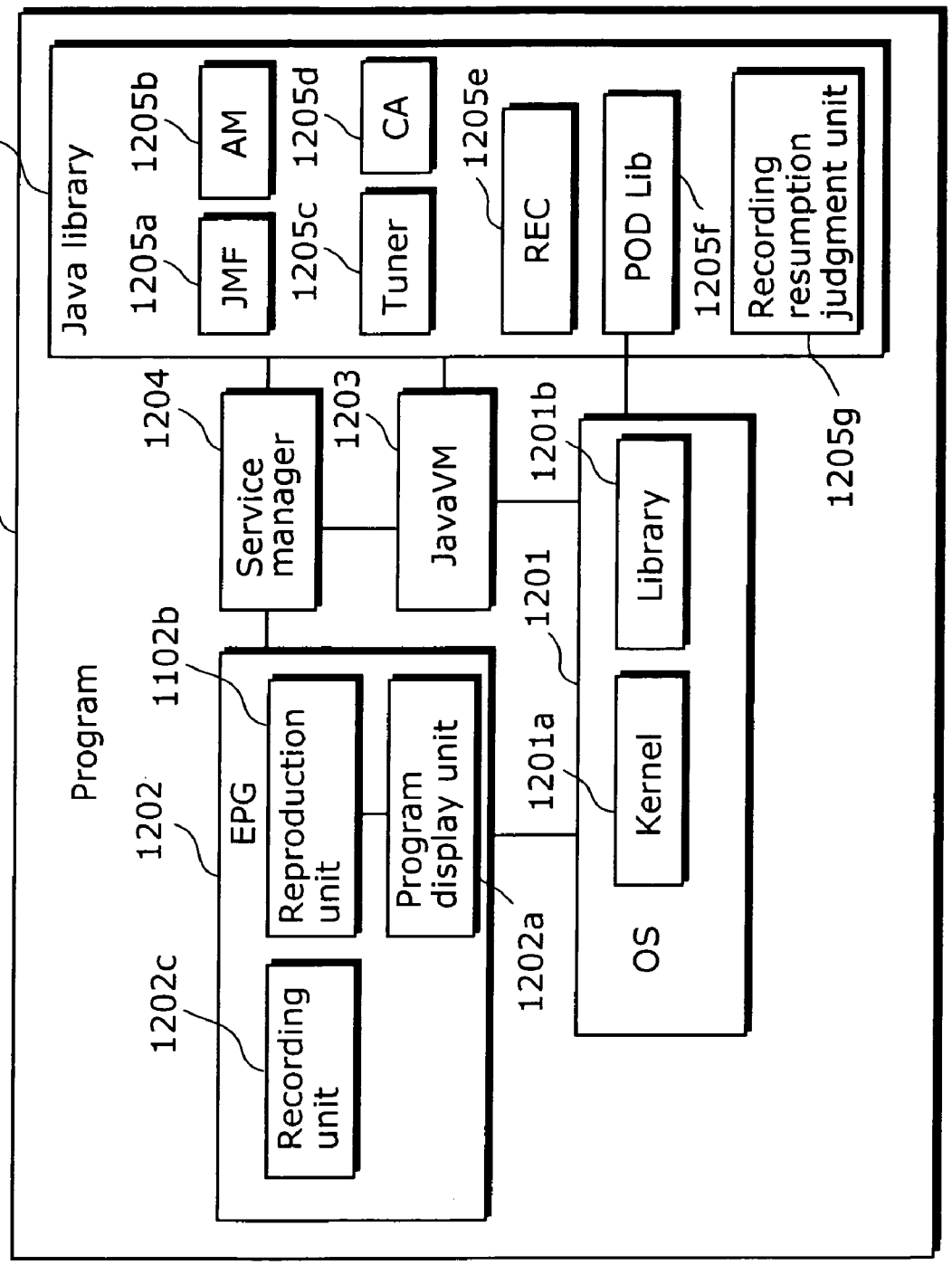
FIG. 32 is a diagram showing an example a structural diagram of the program in the fourth embodiment.

FIG. 32 is a diagram showing an example of a structure diagram of a program stored in the ROM 512 and executed by the CPU 514, in the present embodiment.

Note that units in FIG. 32 having reference numbers that are the same as those in FIG. 13 are the same as, or correspond to, such units in FIG. 13.

Furthermore, as the hardware structure in the present embodiment is approximately the same as that shown in FIG. 6, detailed description is omitted.

In the case where recording is currently being executed for the channel in which descrambling becomes not possible, the recording for such channel is terminated in the aforementioned first embodiment, and the recording for such channel is continued in the aforementioned second embodiment. The present embodiment is characterized by the provision of a recording resumption judgment unit 1205g which terminates the recording when the channel falls into a descrambling-not-possible situation, and then measures the duration for which descrambling was not possible when descrambling becomes possible again, and decides whether or not to resume the recording depending on the measured duration.

To be more specific, description is made for the example where the Java library 1205 includes the recording resumption judgment unit 1205g as a component element. Furthermore, as an additional function is given to the service manager 1204 shown in FIG. 13, the reference number 1204a is assumed here for the service manager 1204.

In addition, it is assumed that aside from having its aforementioned function, the descrambling judgment unit 515 has a function for outputting, to the service manager 1204a, the identifier of the channel for which descrambling has become possible again, in the case where the descrambling becomes possible again after a descrambling-not-possible situation.

As the other areas are the same as in the second embodiment, description in the present embodiment shall be limited to the process of recording resumption.

Here, description is made regarding the operation, for a recording number "1", in which a descrambling-not-possible situation occurs from 10:40, and recording is resumed at 10:45.

First, as previously described, the descrambling judgment unit 515 outputs, to the service manager 1204, the identifier of the channel which is in the descrambling-not-possible situation.

Upon receiving, from the descrambling judgment unit 515, the identifier of the channel for which descrambling has become not possible, the service manager 1204a searches the management table for the recording number being recorded with the inputted channel identifier. Next, the execution status 1705 of the found recording number is rewritten with "3" indicating a status of recording terminated due to a problem. Next, the present time is written as the start time of the problem period for the found recording number. To be more specific, after obtaining 10:40 which is the present time information using, for example, the time obtainment function of the library 1201b within the OS 1201, the service manager 1204a rewrites 10:40 as the start time of the problem period in the management table (see FIG. 33).

The service manager 1204a outputs a terminate-recording instruction to the REC 1205e. Upon receiving the terminate-recording instruction, the REC 1205e terminates the program recording according to the details of the instruction. At this time, the REC 1205e carries out the termination of the recording using a function of the library 1201b within the OS 1201, necessary for recording termination.

Next, in the case where it is judged that descrambling is possible again after it was judged that descrambling was not possible, the descrambling judgment unit 515 outputs, to the service manager 1204a, the identifier of the channel for which descrambling has become possible again.

Upon receiving, from the descrambling judgment unit 515, the identifier of the channel for which descrambling has become possible again, the service manager 1204a searches the management table for the recording number corresponding to the inputted channel identifier. Next, the present time is written as the end time of the problem period for the found recording number. To be more specific, after obtaining 10:45 which is the present time information using, for example, the time obtainment function of the library 1201b within the OS 1201, the service manager 1204a rewrites 10:45 as the end time of the problem period 2701 in the management table (see FIG. 34). Then, the service manager 1204a outputs, to the recording resumption judgment unit 1205g, a judge-resumption instruction and the found recording number.

Next, the recording resumption judgment unit 1205g judges whether or not recording can be resumed for the recording-subject-program corresponding to the received recording number, and outputs the judgment result to the service manager 1204a. The specific operation of the recording resumption judgment unit 1205g will be described later.

Next, the service manager 1204a receives, from the recording resumption judgment unit 1205g, the judgment result for the resumption of recording, and operates according to the judgment result. For example, when the judgment result indicates the resumption of recording, service manager 1204a outputs a record instruction to the REC 1205e, and rewrites the value of the column 1705 corresponding to the recording number to "4" which indicates the resumption of recording from the status of recording terminated due to a problem (see FIG. 35). Upon receiving the record instruction, the REC 1205e carries out the recording using a function of the library 1201b within the OS 1201, necessary for recording.

Furthermore, when the judgment result indicates the non-resumption of recording, the service manager 1204a does not output the record instruction to the REC 1205e. Here, the management table is left as it is in FIG. 34.

Next, the specific operation of the recording resumption judgment unit 1205g is described.

The recording resumption judgment unit 1205g has a function for comparing the problem period during the recording of the program and a predetermined period, and deciding whether or not to resume recording.

Upon receiving the judge-recording resumption instruction and the program number from the service manager 1204a, the recording resumption judgment unit 1205g obtains the problem period for the received recording number by referring to the management table. In the case where a plurality of problem periods exists in the management table for the received recording number, the most recent problem period is referred to and retrieved. For example, assuming the management table is that in FIG. 34, in the case where the recording number "1" is received, the recording resumption judgment unit 1205g refers to the management table and obtains "10:40 to 10:45" which is the most recent problem period among the plurality of problem periods. The recording resumption judgment unit 1205g calculates the predetermined period to be compared to the acquired problem period. For example, referring to the management table, the recording resumption judgment unit 1205g assumes, as the predetermined number, a value (in other words, a time interval) resulting from the subtraction, from the timer-recoding end time indicated in column 1704 of the inputted recording number, of the problem start time, indicated in column 2701, at which the descrambling-not-possible situation occurred. The recording resumption judgment unit 1205g compares the acquired problem period (in this example, 5 minutes) and the calculated predetermined number (in this example, 20 minutes), and judges not to resume recording when the problem period is longer. When the problem period is shorter than the predetermined period, recording resumption judgment unit 1205g judges that recording is to be resumed. The recording resumption judgment unit 1205g outputs, to the service manager 1204a, the judgment result of whether or not to resume recording. In this manner, the resumption of recording beyond the recording end time is eliminated.

Next, the recording resumption in the present embodiment is described using flowcharts.

Figure 36:
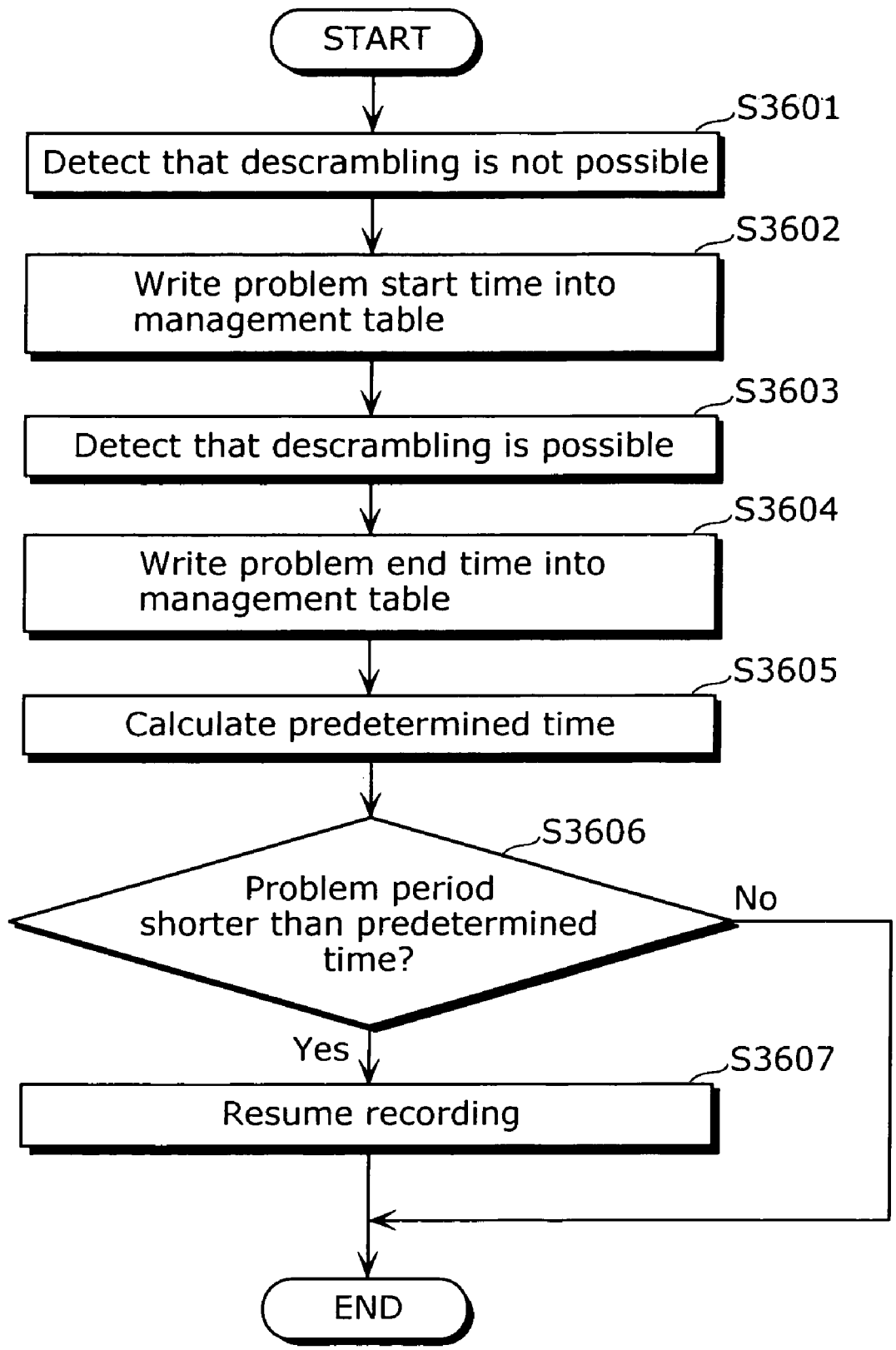
FIG. 36 is a flowchart showing an example of the recording resumption in the fourth embodiment.

FIG. 36 is a flowchart showing an example of the recording resumption in the present embodiment. First, the descrambling judgment unit 515 detects the descrambling-not-possible situation, and outputs, to the service manager 1204a, the identifier of the channel for which descrambling has become not possible (Step 3601).

Next, upon receiving the identifier of the channel for which descrambling has become not possible from the descrambling judgment unit 515, the service manager 1204a causes the recording to be terminated by writing the problem start time for the problem period 2701 of the corresponding recording number in the management table, and outputting a terminate-recording instruction to the REC 1205e (Step 3602).

Next, the descrambling judgment unit 515 detects a descrambling-possible situation, and outputs, to the service manager 1204a, the identifier of the channel for which descrambling has become possible (Step 3603).

Next, upon receiving the identifier of the channel for which descrambling has become possible from the descrambling judgment unit 515, the service manager 1204a writes the problem end time for the problem period 2701 of the corresponding recording number in the management table (Step 3604).

Next, the recording resumption judgment unit 1205g refers to the problem period corresponding to the recording number of the corresponding channel identifier in the management table, then calculates the predetermined period (Step 3605), and compares the problem period and the predetermined period (Step 3606). In the case where, as a result of the comparison, the problem period is shorter (Yes in Step 3606), the recording resumption judgment unit 1205g judges that the recording is to be resumed, and outputs the judgment result to the service manager 1204a. The service manager 1204a causes the resumption of the terminated recording by outputting a record instruction to the REC 1205e (Step 3607).

Furthermore, in the case where, according to the comparison, it is judged that recording is not to be resumed (No in Step 3606), the service manager 1204a does not output the record instruction to the REC 1205e. In this case, the management table is left as it is in FIG. 34.

The flowchart for the recording resumption in the present embodiment is thus described above.

Moreover, instead of calculating the predetermined period, the recording resumption judgment unit 1205g may previously store a predetermined period in the secondary storage unit 510, then compare the stored predetermined period and the problem period 2701, and judge the resumption of recording based on the comparison result.

In this case, when the duration for which descrambling was not possible (NG) is short and below a predetermined threshold T, as in FIG. 30A, recording is resumed at the point where descrambling becomes possible again. Furthermore, when the duration for which descrambling was not possible (NG) is long and equals or exceeds the predetermined threshold T as in FIG. 30B, recording is not resumed even when descrambling becomes possible again. With this, it is possible to control the recording depending on the duration for which descrambling is not possible.

Furthermore, the problem period obtained by the recording resumption judgment unit 1205g by referring to the management table may be the total of the problem periods for an inputted recording number. For example, in the case where the recording number "1" is inputted, the total of the problem periods is, with reference to FIG. 35, the total period indicated by the 5 minutes for the problem period "9:35 to 9:40", the 20 minutes for the problem period "10:10 to 10:30", . . . , and the 5 minutes for the problem period "10:40 to 10:45".

Fifth Embodiment

In the present embodiment, when recording is currently being executed for the channel for which descrambling has become not possible, the recording for that channel is terminated, and when descrambling becomes possible again, the time at which descrambling became possible and the timer-recording schedule are compared and the resumption of the recording is decided depending on the comparison result.

In the present embodiment, the judgment function of the recording resumption judgment unit 1205g has a different function to that in the fourth embodiment. As the other areas are the same as in the fourth embodiment, description is omitted here.

The specific operation of the recording resumption judgment unit 1205g in the present embodiment is described.

The recording resumption judgment unit 1205g compares the end time of the problem period during program recording and the end time of the timer-recording, and decides whether or not to resume the recording.

Upon receiving the judge-recording resumption instruction and the program number from the service manager 1204a, the recording resumption judgment unit 1205g obtains the problem end time of problem period for the received recording number by referring to the management table. In the case where a plurality of problem periods exists in the management table for the received recording number, the end time of the most recent problem period is referred to. For example, assuming that the management table is that in FIG. 34, in the case where the recording number "1" is received, the recording resumption judgment unit 1205g refers to the management table and refers to "10:40 to 10:45" which is the most recent problem period among the plurality of problem periods, and obtains the problem end time of 10:45.

Next, the recording resumption judgment unit 1205g compares the obtained problem end time and the timer-recording end time. For example, recording resumption judgment unit 1205g refers to the management table and compares the timer-recording end time 1704 for the received recording number and the problem end time indicated by the problem period 2701.

The recording resumption judgment unit 1205g compares the referred problem end time (in this example, 10:45) and the timer-recording end time (in this example, 11:00), and judges not to resume recording in the case where the problem end time comes after the timer-recording end time. When the problem end time comes before the timer-recording end time, it is judged that recording is to be resumed. The recording resumption judgment unit 1205g outputs the judgment result for whether or not recording is to be resumed. In this manner, the resumption of recording beyond the recording end time is eliminated.

Next, the recording resumption in the present embodiment is described using flowcharts.

Figure 37:
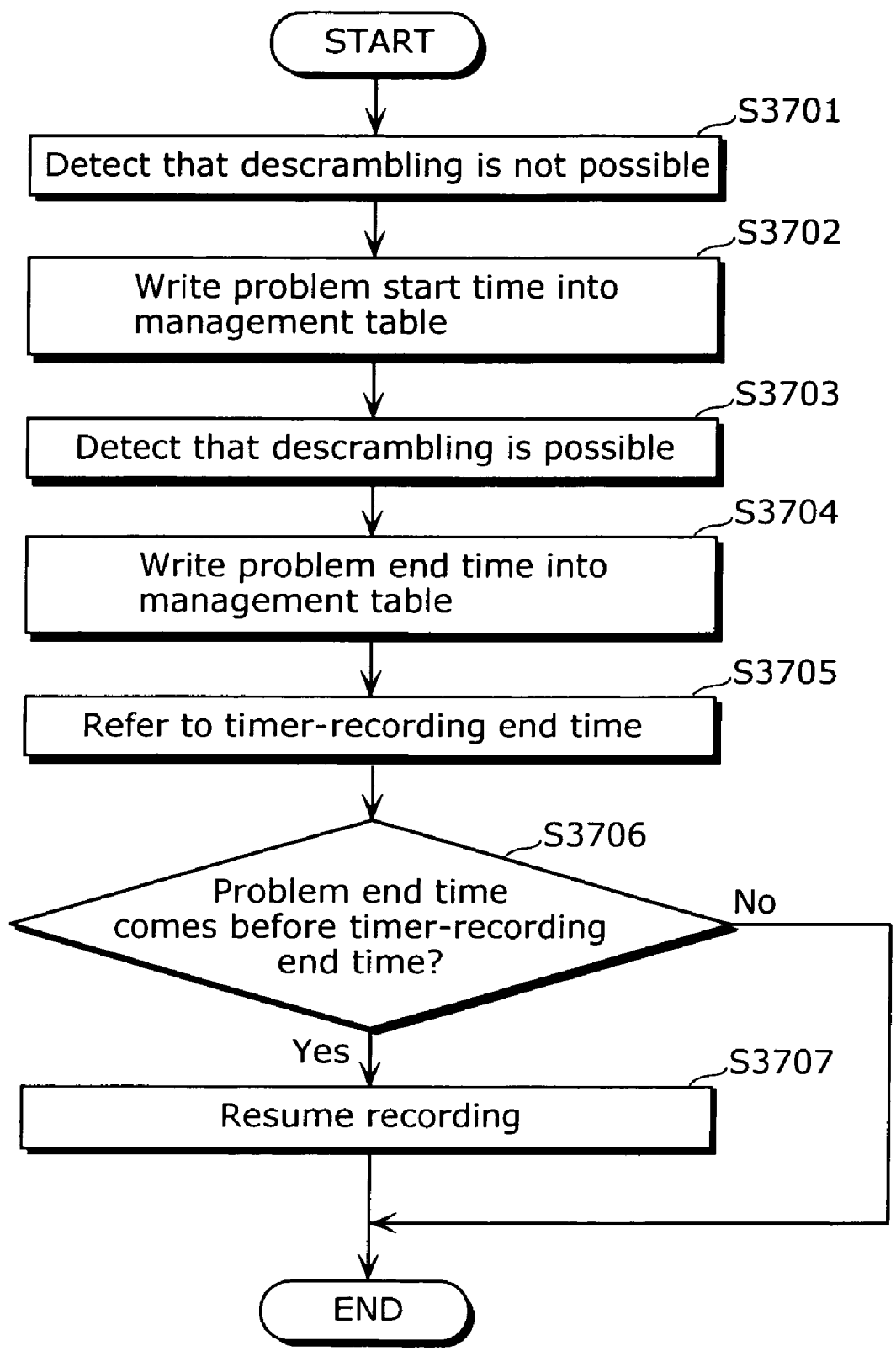
FIG. 37 is a flowchart showing an example of the recording resumption in the fifth embodiment.

FIG. 37 is a flowchart showing an example of the recording resumption in the present embodiment. First, the descrambling judgment unit 515 detects the descrambling-not-possible situation, and outputs, to the service manager 1204a, the identifier of the channel for which descrambling has become not possible (Step 3701).

Next, upon receiving the identifier of the channel for which descrambling has become not possible from the descrambling judgment unit 515, the service manager 1204a causes the recording to be terminated by writing the problem start time for the problem period 2701 of the corresponding recording number in the management table, and outputting a terminate-recording instruction to the REC 1205e (Step 3702).

Next, the descrambling judgment unit 515 detects a descrambling-possible situation, and outputs, to the service manager 1204a, the identifier of the channel for which descrambling has become possible (Step 3703).

Next, upon receiving the identifier of the channel for which descrambling has become possible from the descrambling judgment unit 515, the service manager 1204a writes the problem end time for the problem period 2701 of the corresponding recording number in the management table (Step 3704).

Next, the recording resumption judgment unit 1205g refers to and obtains the problem end time of the problem period for the received recording number, and the timer-recording end time of the recording number (Step 3705).

Next, recording resumption judgment unit 1205g compares the problem end time of the problem period for the received recording number, and the recording end time of the timer-recording of the recording number (Step 3706).

In the case where, as a result of the comparison, the problem end time comes before the timer-recording end time (Yes in Step 3706), the recording resumption judgment unit 1205g judges that the recording is to be resumed, and outputs the judgment result to the service manager 1204a. The service manager 1204a causes the resumption of the terminated recording by outputting a record instruction to the REC 1205e (Step 3707).

Furthermore, in the case where, according to the comparison, it is judged that recording is not to be resumed (No in Step 3706), the service manager 1204a does not output the record instruction to the REC 1205e. In this case, the management table is left as it is in FIG. 34.

The flowchart for the recording resumption in the present embodiment is thus described above.

Figure 38:
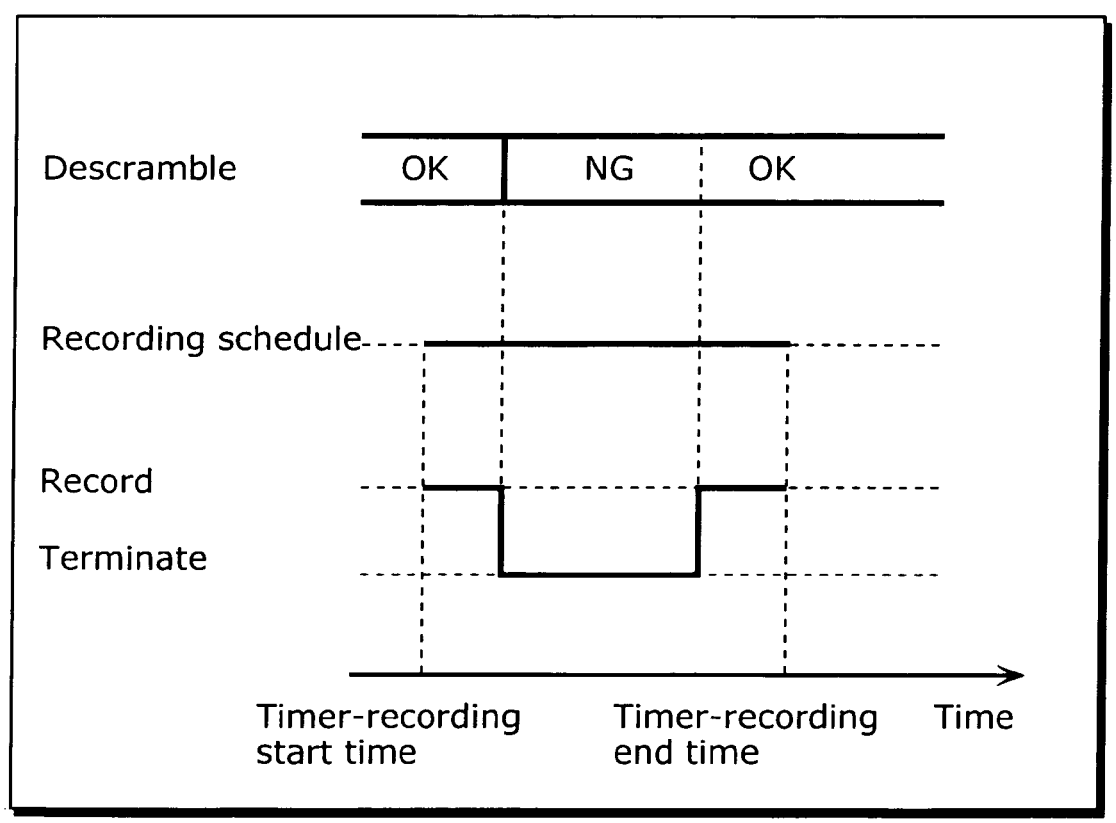
FIG. 38 is a diagram for explaining the resumption of recording depending on the duration for which descramble was not possible, in the fifth embodiment.
Figure 39:
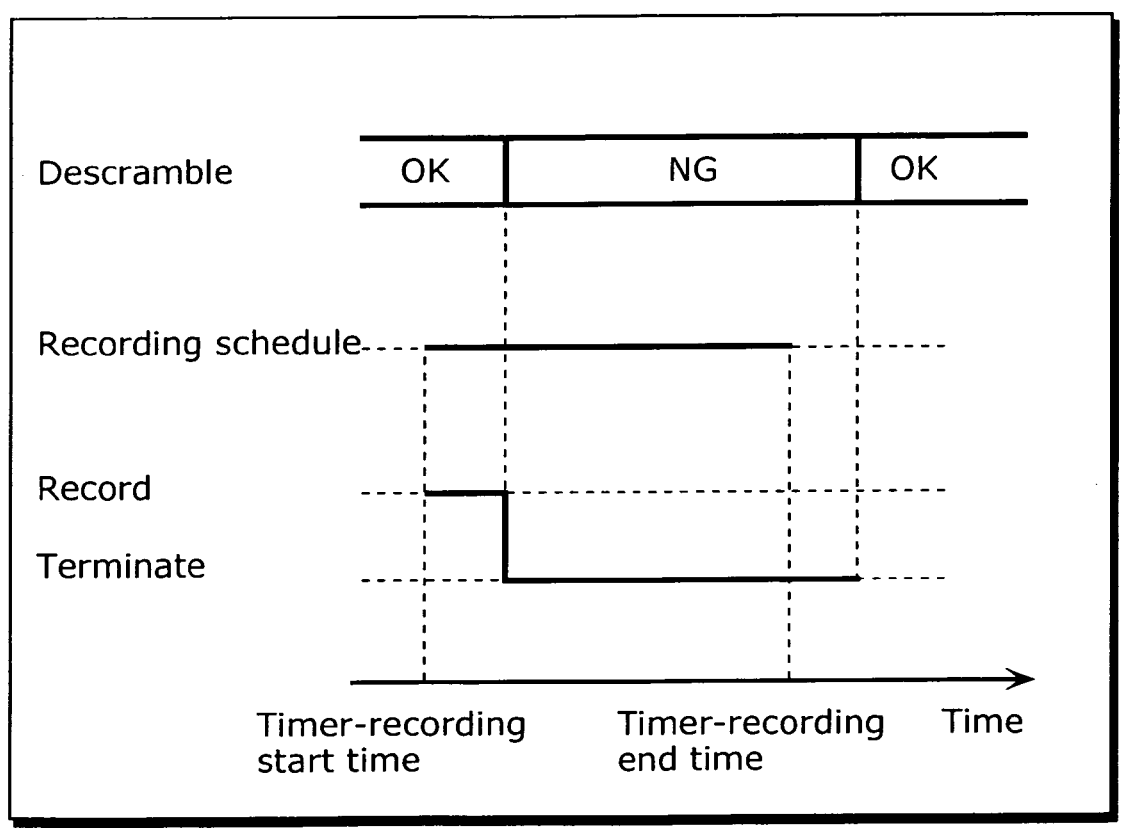
FIG. 39 is a diagram for explaining the resumption of recording depending on the duration for which descramble was not possible, in the fifth embodiment.

According to the present embodiment, it is possible to control the recording depending on the time at which descrambling becomes possible after the occurrence of the problem. In this case, as shown in FIG. 38, when the time at which recovery is made, from the descrambling-not-possible situation to a descrambling-possible (OK) again, is within the span of the timer-recording schedule, recording is resumed at the point where descrambling becomes possible again. Furthermore, as shown in FIG. 39, when the time at which descrambling becomes possible again is outside the span of the timer-recording schedule, recording is not resumed even when descrambling becomes possible again.

Sixth Embodiment

In the aforementioned first to fifth embodiments, the descrambling-not-possible and descrambling-possible situations are assumed as the condition for recording termination and recording resumption. In the present embodiment, problem situations originating from hardware such as an IO bandwidth deficiency (performance concerning the amount of data transferred between hardware), and the condition of tuning influenced by noise, are also assumed as conditions for recording termination and recording resumption. The IO bandwidth deficiency described here indicates the insufficiency of the bandwidth between the TS decoder 505 and the secondary storage unit 510 in comparison to the amount of data transferred from the TS decoder 505 and the secondary storage unit 510. Furthermore, in the present embodiment, the re-activation of the service manager 1204, the EPG 1202, and the Java VM 1203, caused by a fatal error brought about by a program operating on the OS 1201, is also assumed as a condition for recording resumption.

In the present embodiment, in order to execute the recording termination and recording resumption due to hardware-caused problem situations, the functions of the REC 1205e and the Tuner 1205c of the Java library 1205, and the functions of the service manager 1204a are different from those in the first to fifth embodiments. As the other areas are the same as in the first to fifth embodiments, description in the present embodiment shall be limited to recording termination and recording resumption due to hardware problems.

Furthermore, as the hardware structure in the present embodiment is approximately the same as that shown in FIG. 6, detailed description shall be omitted here.

In addition to the functions of the CPU 514 described in the aforementioned embodiments, the CPU 514 detects data input/output-related errors, and notifies the error occurrence to the REC 1205e through the library 1201b. In addition, the CPU 514 outputs, to the secondary storage unit 510, a store instruction and input destination of data to be stored. The CPU 514 detects a data input/output-related error occurring during the outputting, to the secondary storage unit 510, of the store instruction and input destination of the data to be stored. The data input/output-related error may be, for example, an error caused by an IO bandwidth deficiency occurring in the case where the bandwidth between the TS decoder 505 and the secondary storage unit 510 is insufficient in comparison to the amount of data transferred from the TS decoder 505 and the secondary storage unit 510. Furthermore, it may also be a storage capacity deficiency error occurring in the case of attempting to store data which exceeds the storage capacity of the secondary storage unit 510. In addition, the CPU 514 detects the recovery from the aforementioned IO bandwidth deficiency-caused error and storage capacity deficiency error.

The QAM demodulation unit 501 detects a tuning-related error and outputs the detection result to the Tuner 1205c through the library 1201b. The tuning-related error may be, for example, a tuning-failure error occurring when noise intrudes into data sent from the head end 101 and correct data is not inputted to the QAM demodulation unit 501, and when demodulation cannot be carried out due to cable disconnection. Furthermore, after the occurrence of a tuning-related error, the QAM demodulation unit 501 notifies the tuner 1205c, through the library 1201b, of the recovery from the error and that normal processing can be carried out.

The description of the terminal apparatus 500 in the present embodiment is made up to this point.

Figure 40:
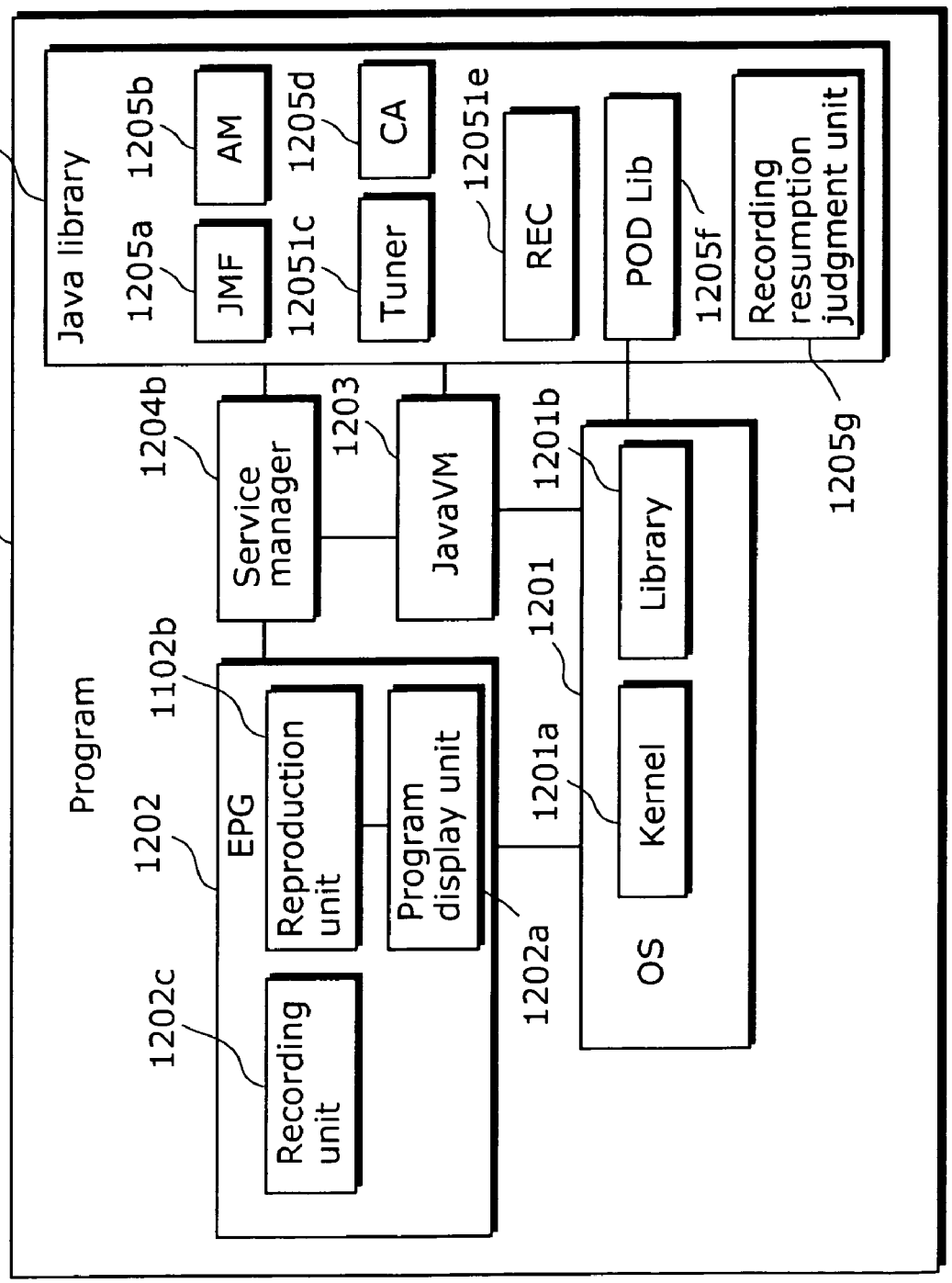
FIG. 40 is a diagram showing an example of the structural diagram of the program in the sixth embodiment.

Next, the program stored in the ROM 512 and executed by the CPU 514, in the present embodiment, is described using FIG. 40. As new functions are added, in the present embodiment, to the Tuner 1205c, the REC 1205e, and the service manager 1204 in the first to fifth embodiments, they are made to assume reference numbers as Tuner 12051c, REC 12051e, and service manager 1204b. Aside from these, everything else is the same as in the first to fifth embodiments.

The Tuner 12051c receives the tuning error occurring in the QAM demodulation unit 501, through the library 1201b. After receiving the error, the Tuner 12051c outputs, to the service manager 1204b, the identifier of the channel in which the tuning error occurred. Furthermore, in the case where the Tuner 12051c receives, from the QAM demodulation unit 501, notification of the recovery from the tuning-related error, the Tuner 12051c outputs, to the service manager 1204b, the identifier of the channel which has recovered from the error.

The REC 12051e receives, through the library 1201b, notification of an IO bandwidth deficiency-cause error, a storage capacity deficiency error, and the like, detected by the CPU 514 during recording. After receiving notification of the error, the REC 12051e notifies the service manager 1204b of the occurrence of the IO bandwidth deficiency-caused error, the storage capacity deficiency error, and the like. Furthermore, when the CPU 514 detects the recovery from the IO bandwidth deficiency-caused error and the storage capacity deficiency error, the REC 12051e receives, through the library 1201b, notification of the recovery from the error. After receiving notification of the recovery from the error, the REC 12051e, notifies the service manager 1204b of the recovery from the error.

Upon receiving, from the Tuner 12051c, the identifier of the channel in which a tuning error occurred, the service manager 1204b searches the management table for the recording number being recorded for the inputted channel identifier. Next, the execution status 1705 of the found recording number is rewritten with "3" indicating a status of recording terminated due to a problem. Next, the present time is written as the start time of the problem period for the found recording number. To be more specific, after obtaining 10:40 which is the present time information using, for example, the time obtainment function of the library 1201b within the OS 1201, the service manager 1204b rewrites 10:40 as the start time of the problem period 2701 in the management table (see FIG. 33).

The service manager 1204b outputs a terminate-recording instruction to the REC 12051e. Upon receiving the terminate-recording instruction, the REC 12051e terminates the program recording according to the details of the instruction. At this time, the REC 12051e carries out the termination of the recording using a function of the library 1201b within the OS 1201, necessary for recording termination.

Next, in the case where the Tuner 12051c receives, from the QAM demodulation unit 501, notification of the recovery from the tuning-related error, the Tuner 12051c outputs, to the service manager 1204b, the identifier of the channel that has recovered from the error.

Upon receiving, from the Tuner 12051c, the identifier of the channel which has recovered from the error, the service manager 1204b searches the management table for the recording number corresponding to the inputted channel identifier. Next, the present time is written as the end time of the problem period for the found recording number. To be more specific, after obtaining 10:45 which is the present time information using, for example, the time obtainment function of the library 1201b within the OS 1201, the service manager 1204a rewrites 10:45 as the end time of the problem period in the management table (see FIG. 34). Then, the service manager 1204a outputs, to the recording resumption judgment unit 1205g, a judge-resumption instruction and the found recording number.

Next, the recording resumption judgment unit 1205g judges whether or not recording can be resumed for the recording-subject-program corresponding to the received recording number, and outputs the judgment result to the service manager 1204b. As the specific operation of the recording resumption judgment unit 1205g is already described in the fourth and fifth embodiments, description shall be omitted here (this example exemplifies that in the fifth embodiment).

Next, the service manager 1204b receives, from the recording resumption judgment unit 1205g, the judgment result for the resumption of recording, and operates according to the judgment result. For example, when the judgment result indicates the resumption of recording, service manager 1204b outputs a record instruction to the REC 12051e, and rewrites the value of the column 1705 corresponding to the recording number to "4" which indicates the resumption of recording from the status of recording terminated due to a problem (see FIG. 35). Upon receiving the record instruction, the REC 12051e carries out the recording using a function of the library 1201b within the OS 1201, necessary for recording.

On the other hand, when the judgment result indicates the non-resumption of recording, the service manager 1204b does not output the record instruction to the REC 12051e. Here, the management table is left as it is in FIG. 34.

Furthermore, upon receiving, from the REC 12051e, notification of the IO bandwidth deficiency-caused error and the storage capacity deficiency error, the service manager 1204b searches the management table for the recording number that is being recorded by the REC 12051e. Next, the execution status 1705 of the found recording number is rewritten with "3" indicating a status of recording terminated due to a problem. Next, the present time is written as the start time of the problem period for the found recording number. To be more specific, after obtaining 10:40 which is the present time information using, for example, the time obtainment function of the library 1201b within the OS 1201, the service manager 1204b rewrites 10:40 as the start time of the problem period 2701 in the management table (see FIG. 33).

The service manager 1204b outputs a terminate-recording instruction to the REC 12051e. Upon receiving the terminate-recording instruction, the REC 12051e terminates the program recording according to the details of the instruction. At this time, the REC 12051e carries out the termination of the recording using a function of the library 1201b within the OS 1201, necessary for recording termination.

Next, in the case where the REC 12051e receives, from the CPU 514, notification of the recovery from the IO bandwidth deficiency-caused error and the storage capacity deficiency error, the REC 12051e notifies the service manager 1204b of the recovery from the error.

Upon receiving, from the REC 12051e, notification of the recovery from the IO bandwidth deficiency-caused error and the storage capacity deficiency error, the service manager 1204b searches the management table for the recording number corresponding to the terminated recording. Next, the present time is written as the end time of the problem period for the found recording number. To be more specific, after obtaining 10:45 which is the present time information using, for example, the time obtainment function of the library 1201b within the OS 1201, the service manager 1204a rewrites 10:45 as the end time of the problem period in the management table (see FIG. 34). Then, the service manager 1204a outputs, to the recording resumption judgment unit 1205g, a judge-resumption instruction and the found recording number.

Next, the recording resumption judgment unit 1205g judges whether or not recording can be resumed for the recording-subject-program corresponding to the received recording number, and outputs the judgment result to the service manager 1204b. As the specific operation of the recording resumption judgment unit 1205g is already described in the fourth and fifth embodiments, description shall be omitted here (this example exemplifies that in the fifth embodiment).

Next, the service manager 1204b receives, from the recording resumption judgment unit 1205g, the judgment result for the resumption of recording, and operates according to the judgment result. For example, when the judgment result indicates the resumption of recording, service manager 1204a outputs a record instruction to the REC 12051e, and rewrites the value of the column 1705 corresponding to the recording number to "4" which indicates the resumption of recording from the status of recording terminated due to a problem (see FIG. 35). Upon receiving the record instruction, the REC 12051e carries out the recording using a function of the library 1201b within the OS 1201, necessary for recording.

Furthermore, when the judgment result indicates the non-resumption of recording, the service manager 1204b does not output the record instruction to the REC 12051e. Here, the management table is left as it is in FIG. 34.

Furthermore, after the re-activation of the service manager 1204b, the EPG 1202, and the Java VM 1203, caused by a fatal error brought about by a program operating on the OS 1201, the service manager 1204b in the present embodiment searches the management table for the recording number with an execution status 1705 bearing a value other than "2" which indicates recording ended. In other words, it searches for a timer-recording process in which the timer-recording is not yet completed until the end. Next the service manager 1204b outputs, to the recording resumption judgment unit 1205g, the found recording number and a judge-recording resumption instruction.

Upon receiving the found recording number and a judge-recording resumption instruction from service manager 1204b, the recording resumption judgment unit 1205g refers to the recording start time and recording end time for the received recording number, in the management table, and judges that the recording is to be resumed when the present time is within such span. When the present time is not within such span, it is judged that recording is not to be resumed. The recording resumption judgment unit 1205g outputs the judgment result to the service manager 1204b.

Next, the service manager 1204*b* receives, from the recording resumption judgment unit 1205*g*, the judgment result for the resumption of recording, and operates according to the judgment result. For example, when the judgment result indicates the resumption of recording, service manager 1204*a* outputs a record instruction to the REC 12051*e*, and rewrites the value of the column 1705 corresponding to the recording number to "4" which indicates the resumption of recording from the status of recording terminated due to a problem (see FIG. 35). Upon receiving the record instruction, the REC 12051*e* carries out the recording using a function of the library 1201*b* within the OS 1201, necessary for recording.

Furthermore, when the judgment result indicates the non-resumption of recording, the service manager 1204*b* does not output the record instruction to the REC 12051*e*. Here, the management table is left as it is in FIG. 34.

Next, the recording resumption in the present embodiment is described using flowcharts.

Figure 41:
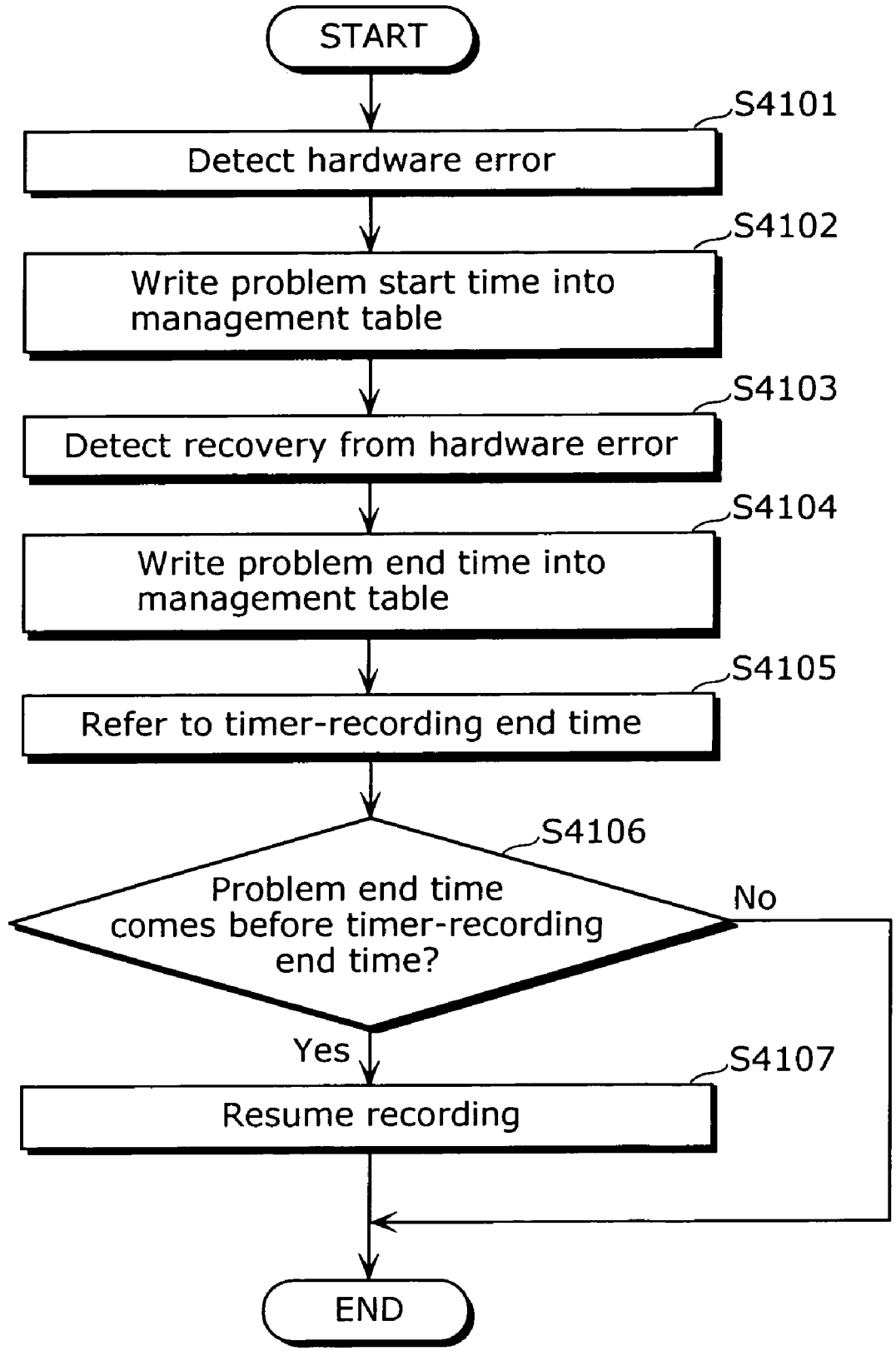
FIG. 41 is a flowchart showing an example of the recording resumption in the sixth embodiment.

FIG. 41 is a flowchart showing an example of the recording resumption in the present embodiment. First, in the case where an IO bandwidth deficiency-caused error and a storage capacity deficiency error occur, the REC 12051*e* receives, from the CPU 514, notification of the IO bandwidth deficiency-caused error and the storage capacity deficiency error, and notifies the service manager 1204*b* of the error occurrence. Furthermore, in the case where the QAM demodulation unit 501 detects a tuning error, the Tuner 12051*c* receives notification of the tuning error from the QAM demodulation unit 501, and then outputs, to the service manager 1204*b*, the identifier of the channel in which the tuning error occurred (Step 4101).

Next, upon receiving the error notification from the REC 12051*e*, or receiving, from the Tuner 12051*c*, the identifier of the channel in which the tuning error occurred, the service manager 1204*b* causes the recording to be terminated by writing the problem start time for the problem period 2701 of the corresponding recording number in the management table, and outputting a terminate-recording instruction to the REC 12051*e* (Step 4102).

Next, in the case where the CPU 514 detects a recovery from the IO bandwidth deficiency-caused error and the storage capacity deficiency error, the REC 12051*e* receives, from the CPU 514, notification of the recovery from the error, and then notifies the service manager 1204*b* of the recovery from the error. Furthermore, in the case where the QAM demodulation unit 501 detects, after the occurrence of the tuning-related error, a recovery from the error and that normal processing can be carried out, the Tuner 12051*c* receives, from the QAM demodulation unit 501, notification of the recovery from the error, and outputs, to the service manager 1204*b*, the identifier of the channel which has recovered from the error (Step 4103).

Next, the service manager 1204*b* writes the problem end time for the problem period 2701 of the corresponding recording number in the management table, based on the information received in Step 4103 (Step 4104).

Next, the recording resumption judgment unit 1205*g* refers to and obtains the problem end time of the problem period for the received recording number, and the timer-recording end time for the recording number (Step 4105).

Next, recording resumption judgment unit 1205*g* compares the problem end time of the problem period for the received recording number, and the timer-recording end time for the recording number (Step 4106).

In the case where, as a result of the comparison, the problem end time comes before the timer-recording end time (Yes in Step 4106), the recording resumption judgment unit 1205*g* judges that the recording is to be resumed, and outputs the judgment result to the service manager 1204*b*. The service manager 1204*b* causes the resumption of the terminated recording by outputting a record instruction to the REC 12051*e* (Step 4107).

Furthermore, in the case where, according to the comparison, it is judged that recording is not to be resumed (No in Step 4106), the service manager 1204*b* does not output the record instruction to the REC 12051*e*. In this case, the management table is left as it is in FIG. 34.

The flowchart for the recording resumption in the present embodiment is thus described above.

Figure 42:
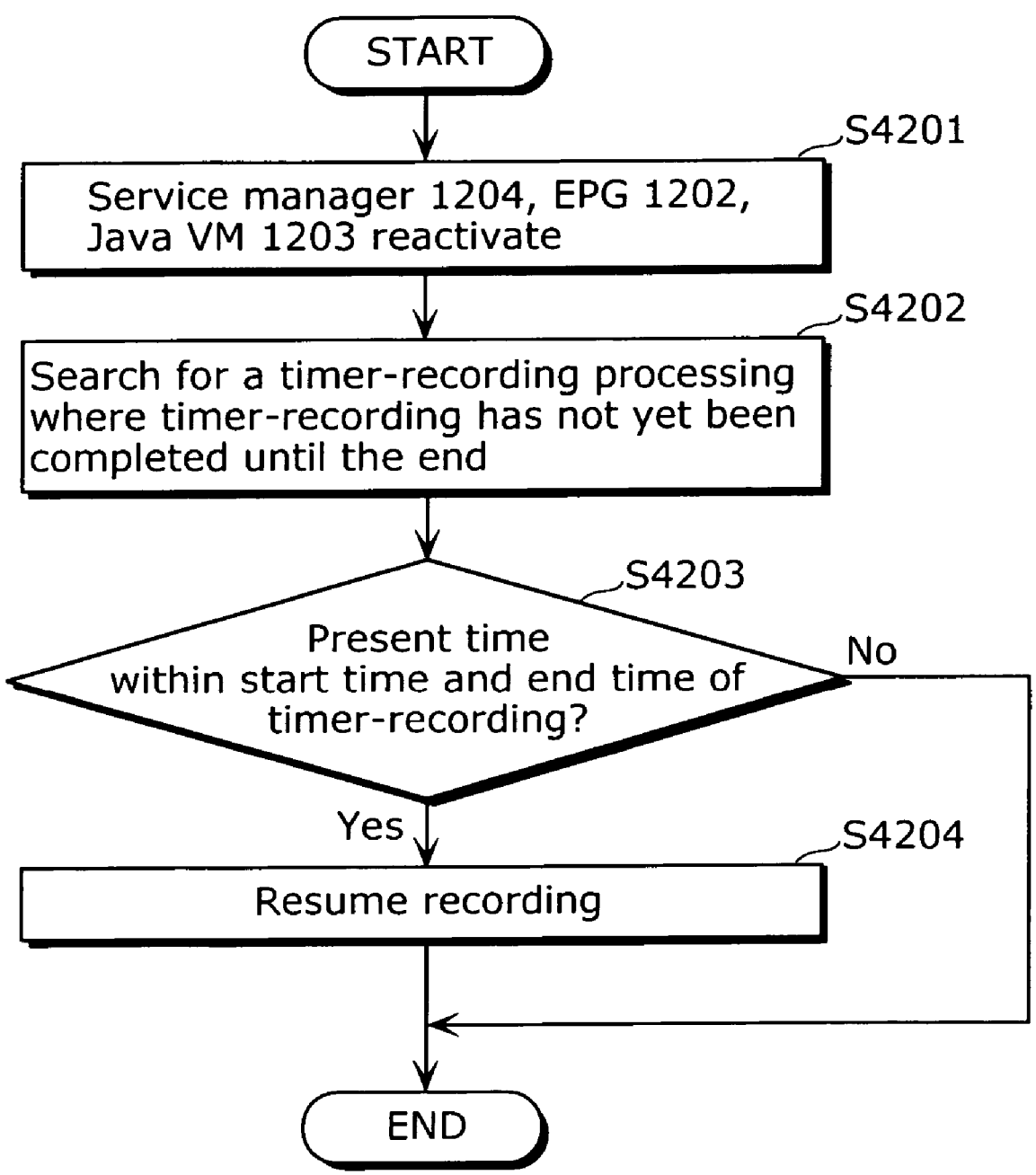
FIG. 42 is a flowchart showing an example of the starting of recording upon re-activation, in the sixth embodiment.

Next, description is made regarding the flow of the automatic recording re-starting upon re-activation of the service manager 1204*b*, the EPG 1202, and the Java VM 1203. FIG. 42 is a flowchart showing an example of the starting of recording upon re-activation, in the sixth embodiment.

First, the service manager 1204, the EPG 1202, and the Java VM 1203 are re-activated due to a fatal error brought about by a program operating on the OS 1201 (Step 4201).

Next the service manager 1204*b* searches the management table for the recording number with an execution status 1705 bearing a value other than "2" which indicates recording ended, and outputs, to the recording resumption judgment unit 1205*g*, the found recording number and a judge-recording resumption instruction (Step 4202).

Next, the recording resumption judgment unit 1205*g* judges whether or not the present time is in between the recording start time and the recording end time (Step 4203).

When the present time is in between the recording start time and the recording end time (Yes in Step 4203), the recording resumption judgment unit 1205*g* judges that the recording is to be started, and outputs the judgment result for starting recording to the service manager 1204*b*. Upon being inputted with the judgment result for starting recording, the service manager 1204*b* outputs a record instruction to the REC 12051*e* (Step 4204). When the present time is not in between the recording start time and the recording end time (No in Step 4203), the service manager 1204*b* concludes the process without outputting the record instruction to the REC 12051*e*.

Accordingly, even in the case where the re-activation of the service manager 1204*b*, the EPG 1202, and the Java VM 1203 occurs during the recording of a program, as long as the time after the re-activation is within the timer-recording schedule, recording is automatically resumed. Accordingly, there is an effect that it becomes unnecessary for the EPG 1202, which is a downloaded Java application, to verify timer-recordings that need to be started, after the re-activation of the service manager 1204*b*, the EPG 1202, and the Java VM 1203.

The digital broadcast recording apparatus according to the present invention is useful as it can reduce the waste of storage capacity by preventing the unintended recording of defective program video onto a recording medium such as a CD-R and a DVD-R and, in the case of unintended recording of defective program video, allows the user to know about the recorded defective video before it is reproduced, thereby eliminating any annoyance that the user may feel in finding out about the recorded defective program video while it is already being reproduced. The digital broadcast recording apparatus according to the present invention is useful in an apparatus which stores scrambled data such as a DVD recorder, a digital television, a personal computer, and a mobile phone.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A digital broadcast recording apparatus, comprising:
a first demodulator operable to demodulate received scrambled data using information including a designated frequency, and to output the demodulated scrambled data;
a descrambler operable to descramble the scrambled data demodulated by said first demodulator, and to output an MPEG-2 transport stream;
a retriever operable to retrieve, from the MPEG-2 transport stream outputted by said descrambler, AV data and a file system which makes up an application;
an executioner operable to execute the application made up by the file system;
a recording controller operable to receive a record request from the executed application, and to control recording according to the received record request;
a recorder operable to record the retrieved AV data according to an instruction from said recording controller;
a holder operable to hold management information for managing the recorded data; and
a detector operable to detect a problem which occurs in processing performed from after the demodulating of the scrambled data by said first demodulator until the retrieving of the AV data,
wherein, in the case where said detector detects the problem during recording of data by said recorder, said recording controller is operable to write, into the management information, the detected problem and a time at which the problem occurred.

2. The digital broadcast recording apparatus of claim 1,
wherein, in the case where said detector detects the problem, said recording controller is operable to notify the detection of the problem to the application issuing the record request.

3. The digital broadcast recording apparatus of claim 1,
wherein said detection is operable to judge whether or not descrambling by said descrambler is possible, and to detect the problem in the case where descrambling is not possible.

4. The digital broadcast recording apparatus of claim 3,
wherein said detector is operable to detect the problem in the case where key information becomes invalid, the key information corresponding to a time limit for using said descrambler.

5. The digital broadcast recording apparatus of claim 3, further comprising:
a second demodulator operable to demodulate key information used in descrambling, the key information being included in a frequency band that is different from a frequency band of the scrambled data,
wherein said descrambler stores, inside said descrambler, the key information used in descrambling, which is demodulated by said second demodulator, and
said detector is operable to detect the problem in one of the cases where: the key information used in descrambling stored within said descrambler is invalid; and the key information used in descrambling cannot be demodulated by said demodulator.

6. The digital broadcast recording apparatus of claim 3,
wherein said descrambler is detachable from said digital broadcast recording apparatus, and
said detector is operable to detect the problem in the case where said descrambler is detached from said digital broadcast recording apparatus.

7. The digital broadcast recording apparatus of claim 1,
where said descrambler is detachable from said digital broadcast recording apparatus, and
said digital broadcast recording apparatus further comprises a detachment controller operable to prohibit detachment of said descrambler from said digital broadcast recoding apparatus while data is being stored.

8. The digital broadcast recording apparatus of claim 1,
wherein said recording controller is operable to control said recording unit to terminate the recording, after said detector detects the problem.

9. The digital broadcast recording apparatus of claim 1,
wherein said recording controller is operable to control said recorder to continue the recording in the case where said detector detects the problem.

10. The digital broadcast recording apparatus of claim 1,
wherein, in the case where, after the recording by said recorder is terminated when said detector detects the problem, said detector can no longer detect the problem, said recording controller is operable to control resumption of the recording by said recorder, according to a predetermined condition.

11. The digital broadcast recording apparatus of claim 10, further comprising:
a measurer operable to measure, in the case where said detector detects the problem during the recording of the AV data, a time period from the detection of the problem to recovery from the problem,
wherein said recording controller is operable to write the measure time period into the management information.

12. The digital broadcast recording apparatus of claim 11,
wherein the predetermined condition is that when the time period measured by said measurer is equal to or shorter than a predetermined time period, the recording by said recorder is to be resumed.

13. The digital broadcast recording apparatus of claim 1,
wherein, in the case where said detector detects the problem, said recording controller is operable to identify a cause of the problem, and to write the identified cause into the management information.

14. The digital broadcast recording apparatus of claim 3,
where said descrambler is operable to simultaneously descramble a plurality of scrambled data, and
said detector is operable to judge whether or not descrambling for each of the plurality of scrambled data is possible, and to detect the problem in the case where descrambling is not possible for scrambled data, among the plurality of scrambled data, corresponding to the AV data being recorded by said recorder.

15. The digital broadcast recording apparatus of claim 1, further comprising:
a media writer operable to store, onto a writeable medium, the AV data recorded by said recorder.

16. The digital broadcast recording apparatus of claim 15,
wherein said media writer is operable to refer to the management information when the recorded AV data is to be stored onto the medium, and to not store the AV data onto the medium in the case where the problem occurred during the recording of the AV data to be stored.

17. The digital broadcast recording apparatus of claim 15, further comprising:
a notifier operable to refer to the management information when the recorded AV data is to be stored onto the medium, and, in the case where the problem occurred during the recording of the AV data to be stored, to notify a user of the occurrence of the problem during the recording.

18. The digital broadcast recording apparatus of claim 17, further comprising:

an instruction obtainer operable to obtain, from the user, an instruction which is based on the notification by said notifier, wherein said media writer is operable to store the data onto the medium in the case where the instruction obtained by said instruction obtainer is a write instruction.

19. The digital broadcast recording apparatus of claim 1, further comprising:

a reproducer operable to reproduce the recorded AV data; and a notifier operable to refer to the management information when the recorded AV data is to be reproduced by said reproducer, and, in the case where the problem occurred during the recording of the AV data to be reproduced, to notify a user of the occurrence of the problem during the recording.

20. A digital broadcast recording method, comprising:

demodulating received scrambled data using information including a designated frequency, and outputting the demodulated scrambled data;

descrambling the scrambled data demodulated in said demodulating, and outputting an MPEG-2 transport stream;

retrieving, from the MPEG-2 transport stream outputted in said descrambling, AV data and a file system which make up an application;

executing the application made up by the file system;

controlling recording according to a record request received from the executed application;

recording the retrieved AV data according to an instruction given in said controlling; and detecting a problem which occurs in processing performed from after the demodulation of the scrambled data in said demodulating until said retrieving of the AV data, wherein, in said controlling, the detected problem and a time at which the problem occurred are writer into management information for managing the recorded data, in the case where, in said detecting, the problem is detected during the recording of data in said recording.

* * * * *